(12) United States Patent
Fallon et al.

(10) Patent No.: US 12,359,042 B2
(45) Date of Patent: Jul. 15, 2025

(54) FIBER-BLENDED HETEROPHASIC COPOLYMER FOR ADDITIVE-MANUFACTURE FEEDSTOCK

(71) Applicant: BRASKEM AMERICA, INC., Philadelphia, PA (US)

(72) Inventors: Jacob Fallon, Pittsburgh, PA (US); Alexandre Di Pintor Da Luz, Pittsburgh, PA (US); Michelle Sing, Pittsburgh, PA (US); Kevin Herrington, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 777 days.

(21) Appl. No.: 17/701,063

(22) Filed: Mar. 22, 2022

(65) Prior Publication Data
US 2022/0298328 A1 Sep. 22, 2022

Related U.S. Application Data

(60) Provisional application No. 63/164,324, filed on Mar. 22, 2021.

(51) Int. Cl.
*C08K 9/06* (2006.01)
*C08K 3/04* (2006.01)
(Continued)

(52) U.S. Cl.
CPC .............. *C08K 9/06* (2013.01); *C08K 3/04* (2013.01); *C08K 5/5403* (2013.01); *C08K 7/06* (2013.01); *C08K 7/14* (2013.01)

(58) Field of Classification Search
CPC combination set(s) only.
See application file for complete search history.

(56) References Cited

U.S. PATENT DOCUMENTS 8,309,659 B2 * 11/2012 Masarati ................. C08L 23/10
525/88
9,169,336 B2 * 10/2015 Dagley .................... C08F 10/06
(Continued)

FOREIGN PATENT DOCUMENTS

EP 3351594 A1 * 7/2018 ............. B29B 11/10
EP 3351594 B1 9/2021
(Continued)

OTHER PUBLICATIONS

Spoerk et al., "Material extrusion-based additive manufacturing of polypropylene: A review on how to improve dimensional inaccuracy and warpage," Journal of Applied Polymer Science: 1-16 (2020).

*Primary Examiner* — Peter A Salamon
(74) *Attorney, Agent, or Firm* — Jeffrey N. Townes; Cozen O'Connor

(57) ABSTRACT

The invention relates to an additive-manufacture feedstock, comprising a heterophasic copolymer having a melt flow rate of from 0.1 to 150 g/10 min (230° C./2.16 kg), measured according to ASTM D 1238, and a fiber blended in the heterophasic copolymer. The first-fiber-blended heterophasic copolymer, when in the form of a printed article, exhibits a minimized warpage. The invention also relates to methods of making the additive-manufacture feedstock and methods of 3D printing using the additive-manufacture feedstock in various forms.

27 Claims, 7 Drawing Sheets

(51) Int. Cl.
    *C08K 5/54*         (2006.01)
    *C08K 7/06*         (2006.01)
    *C08K 7/14*         (2006.01)

(56) References Cited

U.S. PATENT DOCUMENTS

| | | |
|---|---|---|
| 10,392,498 B2 | 8/2019 | Jerabek et al. |
| 10,544,297 B2 | 1/2020 | Jerabek et al. |
| 10,717,832 B2 | 7/2020 | Boragno et al. |
| 2016/0185050 A1* | 6/2016 | Topolkaraev ......... B29C 64/118 425/375 |
| 2019/0232554 A1 | 8/2019 | De Palo et al. |

FOREIGN PATENT DOCUMENTS

| | | | |
|---|---|---|---|
| WO | WO-2017057424 A1 * | 4/2017 | ............. B29B 11/10 |
| WO | 2017079130 A1 | 5/2017 | |
| WO | 2020/041291 A1 | 2/2020 | |
| WO | 2021/069242 A1 | 4/2021 | |
| WO | 2021063855 A1 | 4/2021 | |

* cited by examiner

FIBER-BLENDED HETEROPHASIC COPOLYMER FOR ADDITIVE-MANUFACTURE FEEDSTOCK

This application claims the benefit of priority to U.S. Provisional Patent Application No. 63/164,324, filed on Mar. 22, 2021, which is herein incorporated by reference in its entirety.

FIELD OF THE INVENTION

This invention generally relates to an additive-manufacture feedstock comprising a heterophasic copolymer blended with a fiber to minimize warpage in the field of 3D printing.

BACKGROUND OF THE INVENTION 3D printing of polymer materials typically employs fused filament fabrication technology (FFF) (also known as fused deposition modelling, FDM) or fused particle fabrication (FPF) (also known as fused granular fabrication, FGF). The technology involves melting or softening the polymer materials, in the forms of filaments or pellets, to produce polymer strands. The polymer strands are deposited and arranged, layer by layer, onto a substrate that is often cooler in temperature than the melted or softened polymer strands. This differential temperature combined with the temperature of the environment contribute to cooling the deposited polymer from a molten state to a solid state to obtain a 3D printed polymer object.

These material-extrusion-based 3D printing technologies are sensitive to part warping that occurs during the 3D printing process. Not only does warping result in the printed part deforming relative to the initial design, but warping can also cause catastrophic failures in the printing process itself.

Originally, a majority of polymer materials for 3D printing were amorphous materials. More recently, polypropylene fiber composites have become of an interest to the 3D printing industry for their mechanical properties, low density, thermal properties, conductivity, and chemical resistance. However, 3D printing of crystalline or semi-crystalline polymers has been challenging because these polymers are often prone to warping. For semi-crystalline polymers such as polypropylene, the thermal gradients induce crystallization as the material cools down and subsequently shrinks in volume. As the printing process continues in a layer-by-layer fashion, variation in thermal history, and thus material volume between each of the additively manufactured layers, results in the development of internal stresses within the printed part. These stresses result in the deformation of the highly stressed layers, which can cause not only poor dimensional accuracy but also failures of building, e.g., between the deposited layers and the printer bed and/or between subsequent layers of a printed part. Warpage is often highest at sharp corners where stresses are concentrated and difficult to resist.

The low polarity of the semicrystalline polyolefins like polypropylene can also result in poor adhesion to the 3D printer bed, which can cause an unsuccessful printing process. This poor adhesion to the printer bed can also exacerbate issues with part warping.

Fiber fillers have been used as a possible means to address some of these issues. However, the addition of fiber fillers also introduces new issues, including incompatibility, nozzle clogging, and lack of ductility under strain/tension; it can also lead to fracturing both during filament handling in the printing process, as well as during the loading, unloading, and/or shipping of the filament.

Because of these aforementioned challenges, currently available fiber-filled polypropylene materials on the market often lack the processability required in a material-extrusion-based 3D printing technology, such as FFF and FPF. There thus remains a need in the art to develop a fiber-filled-polypropylene based additive-manufacture feedstock that provides an improved processability for 3D printing, such as increased warpage resistance, while maintaining or having an improved mechanical performance.

SUMMARY OF THE INVENTION

One aspect of the invention relates to an additive-manufacture feedstock, comprising a heterophasic copolymer having a melt flow rate of from 0.1 to 150 g/10 min (230° C./2.16 kg), measured according to ASTM D 1238, and a first-fiber blended in the heterophasic copolymer. The first-fiber is present in the additive-manufacture feedstock in an amount of from 1.0 to 40 wt %, relative to 100 wt % of the additive-manufacture feedstock. The first-fiber-blended heterophasic copolymer, when in the form of a printed article, exhibits a warpage resistance rating of at most 1 mm, measured according to the following equation and 48 hours after printing the printed article $$\text{warpage resistance rating} = \frac{\sum_{i=1}^{N} WS_i}{N}$$

In this equation:
- $\sum_{i=1}^{N} WS_i$ sums the values of WSi, starting at $WS_1$ and ending with $WS_N$,
- N is the total number of printed articles measured for warpage resistance rating evaluation,
- i is a $i^{th}$ printed article measured,
- $WSi = \text{Max}(X_1, X_2, X_3, X_4)_i - \text{Min}(Y_1, Y_2, Y_3, Y_4)_i$ for a $i^{th}$ printed article measured,
- $X_1$, $X_2$, $X_3$, and $X_4$, respectively, represent a height of a first central edge, a height of a second central edge, a height of a third central edge, and a height of a fourth central edge, of the $i^{th}$ printed article measured,
- $Y_1$, $Y_2$, $Y_3$, and $Y_4$, respectively, represent a height of a first corner edge, a height of a second corner edge, a height of a third corner edge, and a height of a fourth corner edge, of the $i^{th}$ printed article measured,
- Max $(X_1,X_2,X_3,X_4)_i$ represents the maximum value of $X_1$, $X_2$, $X_3$, and $X_4$, for the $i^{th}$ printed article measured, and
- Min $(Y_1,Y_2,Y_3,Y_4)_i$ represents the minimum value of $Y_1$, $Y_2$, $Y_3$, and $Y_4$, for the $i^{th}$ printed article measured.

Each printed article measured for warpage resistance rating evaluation is a 60 mm×60 mm×60 mm cubic box, each side of the cubic box having a thickness of 1 mm.

Another aspect of the invention relates to a filament formed from the additive-manufacture feedstock as described from the above aspect of the invention.

Another aspect of the invention relates to a distribution (or a suspension) of pellets, each pellet formed from the additive-manufacture feedstock as described from the above aspect of the invention.

Another aspect of the invention relates to a method of three-dimensional printing. The method comprises: (1) supplying the additive-manufacture feedstock as described from the above aspect of the invention to a printing apparatus and forming a hot-melt of the additive-manufacture feedstock;

(2) depositing the hot-melt of the additive-manufacture feedstock from the printing apparatus on a substrate to form a first deposited printing layer; (3) repeating (1) and (2) to deposit a second printing layer on the first printing layer; and (4) optionally depositing at least one further printing layer on said second printing layer.

Another aspect of the invention relates to a method of making an additive-manufacture feedstock. The method comprises: blending a heterophasic copolymer having a melt flow rate of from 0.1 to 150 g/10 min (230° C./2.16 kg), measured according to ASTM D 1238, and a first-fiber to form an additive-manufacture feedstock comprising the first-fiber-blended heterophasic copolymer. The first-fiber is present in the additive-manufacture feedstock in an amount of from 1.0 to 40 wt %, relative to 100 wt % of the additive-manufacture feedstock. The first-fiber-blended heterophasic copolymer, when in the form of a printed article, exhibits a warpage resistance rating of at most 1 mm, measured according to the following equation and 48 hours after printing the printed article $$\text{warpage resistance rating} = \frac{\sum_{i=1}^{N} WS_i}{N}$$

The variables in the warpage resistance rating equation and the measurement conditions relating to the warpage resistance rating equation are the same as those defined above in the aspect of the invention relating to an additive-manufacture feedstock.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

BRIEF DESCRIPTION OF THE DRAWINGS

FIG. 4A is a close-up view of the 3D printed article which contains a support material below the printed part to enable the printing of the design. FIG. 4B is a full view of the same 3D printed article with the support material removed.

FIG. 5A shows the print orientation using 3D printing. FIG. 5B shows a printed open-ended, thin-walled box with the illustrations of the expected height of one edge from the model as well as the measured height of the printed box for the same edge, for warpage resistance rating evaluation. FIG. 5C illustrates an exemplary box projecting onto the X-Y plane and identifying the locations for $X_1$, $X_2$, $X_3$, and $X_4$, and $Y_1$, $Y_2$, $Y_3$, and $Y_4$, for warpage resistance rating equation. FIG. 5D provides another view and illustration for a hypothetical box for which the warpage resistance is determined, with the left panel showing the view of projecting the box onto the X-Y plane, and the right panel showing the view of the expected height from the center edge and the measured height from the corner edge.

DETAILED DESCRIPTION OF THE INVENTION

Figure 1:
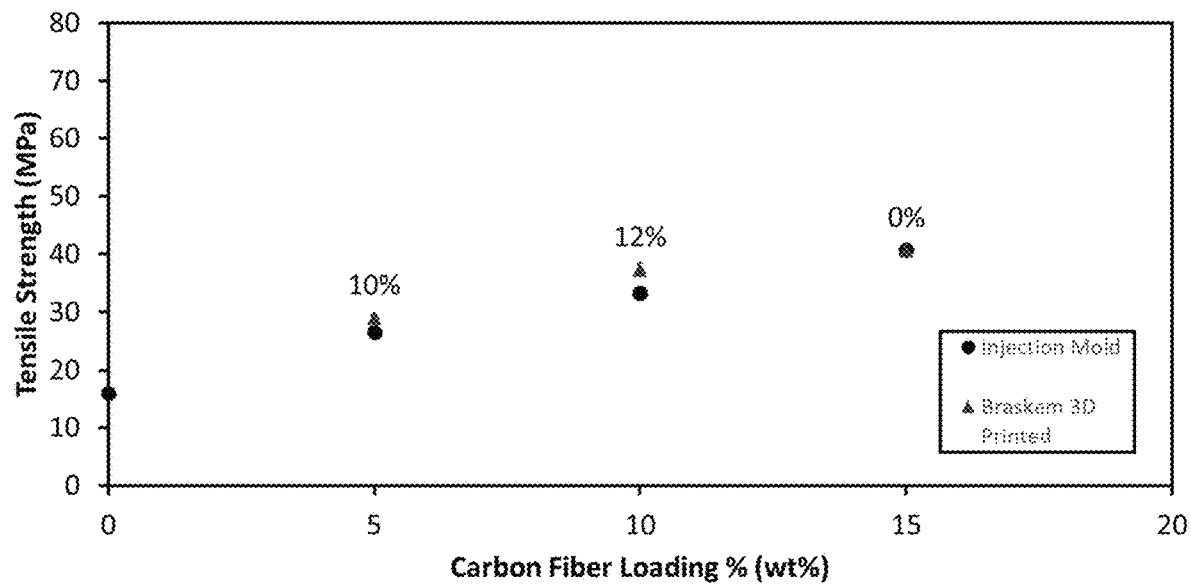
FIG. 1 shows the results of the tensile strength of the objects made from 3D printing technique as compared to that of the objects made from injection mold technique, as a function of carbon fiber loading. The feedstock used was an exemplary additive-manufacture feedstock having a heterophasic polypropylene copolymer blended with carbon fibers, as described in Example 1. The numbers above each set of data points are % difference between 3D-printed samples and injection molded samples.

The disclosure provides an additive-manufacture feedstock comprising a fiber-filled heterophasic copolymer (e.g., an impact copolymer polypropylene) that balances the melt flow rate of the fiber-filled heterophasic copolymer composite, the constituents of the heterophasic copolymer, and the fiber loading to produce a feedstock material which has an improved processability in material-extrusion-based 3D printing technology, such as FFF and FPF. The resulting feedstock material does not clog the nozzle of the 3D printer (e.g., a nozzle of a 0.6 mm diameter), has an improved warpage resistance, and has the toughness to withstand normal wear and tear of handling on a filament spool.

Components for Additive-Manufacture Feedstock

One aspect of the invention relates to an additive-manufacture feedstock, comprising a heterophasic copolymer having a melt flow rate of from about 0.1 to 150 g/10 min, measured according to ASTM D 1238 (230° C./2.16 kg), and a first-fiber blended in the heterophasic copolymer. The first-fiber is present in an amount of from about 1.0 to 40 wt %, relative to 100 wt % of the additive-manufacture feedstock.

The first-fiber-blended heterophasic copolymer exhibits a minimized warpage, when in the form of a printed article.

The warpage resistance rating of the first-fiber-blended heterophasic copolymer in the additive-manufacture feedstock is measured according to the following equation:

$$\text{warpage resistance rating} = \frac{\sum_{i=1}^{N} WS_i}{N}$$

To determine the warpage resistance rating of the first-fiber-blended heterophasic copolymer in the additive-manufacture feedstock, a number of specimens (articles) are printed and measured, and the measurements are done 48 hours after the specimens (articles) are printed. Each printed article measured for warpage resistance rating evaluation is a 60 mm×60 mm×60 mm cubic box, and each side of the cubic box has a thickness of 1 mm.

In the above equation, $\sum_{i=1}^{N} WS_i$ sums the values of WSi, starting at $WS_1$ and ending with $WS_N$. N is the total number of printed articles measured for warpage resistance rating evaluation, and i is a $i^{th}$ printed article measured. As an example, three specimens (articles) are printed and measured for the warpage resistance rating evaluation. Typically, N is at least 3 for the warpage evaluation results to be statistically significant.

The warpage resistance value for each specimen is calculated as $WSi = \text{Max } (X_1, X_2, X_3, X_4)_i - \text{Min } (Y_1, Y_2, Y_3, Y_4)_i$ for a $i^{th}$ printed article measured. In this formula, $X_1$, $X_2$, $X_3$, and $X_4$, respectively, represent a height of a first central edge, a height of a second central edge, a height of a third central edge, and a height of a fourth central edge, of the $i^{th}$ printed article measured. $Y_1$, $Y_2$, $Y_3$, and $Y_4$, respectively, represent a height of a first corner edge, a height of a second corner edge, a height of a third corner edge, and a height of a fourth corner edge, of the $i^{th}$ printed article measured. Max $(X_1, X_2, X_3, X_4)_i$ represents the maximum value of $X_1$, $X_2$, $X_3$, and $X_4$, for the $i^{th}$ printed article measured. Min $(Y_1, Y_2, Y_3, Y_4)_i$ represents the minimum value of $Y_1$, $Y_2$, $Y_3$, and $Y_4$, for the $i^{th}$ printed article measured.

The warpage resistance rating calculated from this equation provides an indication of how well the additive-manufacture feedstock material used to print articles resists the thermodynamic warping that may occur during 3D printing of the articles. The lower the warpage resistance rating, the lower the warpage, and the better performance of the additive-manufacture feedstock material. The method for measuring the warpage resistance rating is discussed in details in Example 2 and Example 3.

Based on the above equation for evaluating warpage, the first-fiber-blended heterophasic copolymer in the additive-manufacture feedstock, when in the form of a printed article, exhibits a warpage resistance rating of no more than 1 mm, no more than 0.95, no more than 0.9 mm, no more than 0.85 mm, no more than 0.8 mm, no more than 0.75 mm, no more than 0.7 mm, no more than 0.65 mm, no more than 0.6 mm, no more than 0.55 mm, no more than 0.5 mm, no more than 0.45 mm, no more than 0.4 mm, no more than 0.35 mm, no more than 0.3 mm, no more than 0.25 mm, no more than 0.2 mm, no more than 0.15 mm, no more than 0.1 mm, no more than 0.05 mm, or virtually free of warpage.

It is to be understood that the measurement conditions for warpage resistance rating evaluation, such as the number of printed article, and the shape, dimension, and thickness of the specimen printed (i.e., three 60 mm×60 mm×60 mm cubic boxes), are for the purpose of measuring and evaluating warpage resistance rating only, and are by no means limiting the usage, i.e., 3D printing, of the additive-manufacture feedstock. The additive-manufacture feedstock can be printed in any shape, any dimension, with any thickness, depending on the desired model.

In some embodiments, the disclosure provides an additive-manufacture feedstock, in the form of an extruded article, comprising a heterophasic copolymer having a melt flow rate of from about 0.1 to 150 g/10 min, measured according to ASTM D 1238 (230° C./2.16 kg), and a first-fiber blended in the heterophasic copolymer. The first-fiber is present in an amount of from about 1.0 to 40 wt %, relative to 100 wt % of the additive-manufacture feedstock. The first-fiber-blended heterophasic copolymer in the extruded article exhibits a minimized warpage, with a warpage resistance rating, when forming into a manufactured article, of at most 1 mm, measured 48 hours after printing the printed article and according to the following equation:

$$\text{warpage resistance rating} = \frac{\sum_{i=1}^{N} WS_i}{N}$$

The term "heterophasic copolymer" means a copolymer that comprises, consists essentially of, consists of, includes, or has, a matrix phase and a disperse phase. A heterophasic copolymer can include a heterophasic polyolefin copolymer where one polyolefin is the matrix phase (or continuous phase) and an elastomeric phase is uniformly dispersed therein (disperse phase). Typically, the matrix phase (or continuous phase) can contain a propylene-based polymer and the disperse phase can contain an olefin-based elastomer. The disperse phase can also be referred to as a discontinuous phase, a rubber phase, or an elastomeric phase. For instance, if an olefin-based elastomer is combined with the propylene-based polymer, the matrix can comprise, consist essentially of, consist of, include, or have, the elastomer dispersed therein. Elastomers other than olefin-based elastomers and polymers other than propylene-based polymers are also within the scope of the present disclosure.

The disperse phase in the heterophasic copolymer may be present in an amount of from about 5 wt % to about 50 wt %, from about 10 wt % to about 50 wt %, from about 5 wt % to about 40 wt %, from about 5 wt % to about 35 wt %, or from about 7.5 wt % to about 35 wt %. The amount of the disperse phase in the heterophasic copolymer can have an impact on the processability performance of the additive-manufacture feedstock. If the amount of disperse phase is too low, the heterophasic copolymer can contain too much crystalline portion, which results in a higher volume shrinkage, thus a high warpage and a decrease in mechanical properties such as toughness, tensile, and elongation break. The high warpage may result in the additive-manufacture feedstock being pulled away from the printer bed, leading to a printing failure. On the other hand, if the amount of the disperse phase is too high, the heterophasic copolymer can become too flexible, resulting in an additive-manufacture feedstock that is difficult to feed to the printer nozzle. This can also lead to the heterophasic copolymer lacking enough chemical resistance and mechanical strength. In one embodiment, the disperse phase in the heterophasic copolymer is present in an amount of from about 7.5 wt % to about 40 wt %, from about 10 wt % to about 40 wt %, from about 15 wt % to about 40 wt %, from about 7.5 wt % to about 35 wt %, from about 10 wt % to about 35 wt %, from about 15 wt % to about 35 wt %, or from about 15 wt % to about 30 wt %. The amount of the disperse phase may be estimated by the amorphous content measured by xylene soluble content, according to ASTM D5492-17.

In some embodiments, the matrix phase of the heterophasic copolymer comprises a propylene-based polymer. The term "propylene-based polymer," as used herein, refers to a polymer that comprises a majority weight percent polymerized propylene monomer (based on the total amount of polymerizable monomers), and optionally may comprise at least one or more polymerized comonomers. The polypropylene-based copolymer can be made up of linear and/or branched polymer chains, optionally containing long-chain branches.

Suitable propylene-based polymers include propylene homopolymers, propylene copolymers, and propylene interpolymers. The polypropylene homopolymer can be isotactic, syndiotactic, or atactic polypropylene. The propylene interpolymer can be a random copolymer, a block copolymer, an alternating copolymer, a periodic copolymer, an impact copolymer, or a propylene-based terpolymer. Reactor copolymers of polypropylene may also be used.

Suitable comonomers for polymerizing with propylene, to form the propylene-based copolymer, include but are not limited to an α-olefin and a monomer having at least two double bonds. Exemplary α-olefins are linear, branched, or cyclic α-olefins having 2 to 20 carbon atoms, 2 to 16 carbon atoms, or 2 to 12 carbon atoms, including but not limited to ethylene, 1-butene, 2-butene, 1-pentene, 3-methyl-1-butene, 1-hexene, 4-methyl-1-pentene, 3-methyl-1-pentene, 1-heptene, 4-methyl-1-hexene, 5-methyl-1-hexene, 4,6-dimethyl-1-heptene, 1-octene, 1-nonene, 1-decene, 1-undecene, 1-dodecene, 1-tetradecene, 1-hexadecene, 1-octadecene, 1-eicocene, vinylcyclohexane, styrene, tetracyclododecene, norbornene, 5-ethylidene-2-norbornene (ENB), and combinations thereof. In the context of the present invention, ethylene and styrene are considered α-olefins. In one embodiment, the comonomers include ethylene, 1-butene, 1-hexene, 1-octene and any combination thereof.

Exemplary monomers having at least two double bonds are dienes or trienes comonomers, including but not limited to butadiene (e.g., 1,3-butadiene); pentadiene (e.g., 1,3-pentadiene; 1,4-pentadiene; 3-methyl-1,4-pentadiene; 3,3-dimethyl-1,4-pentadiene); hexadienes (e.g., 1,3-hexadiene; 1,4-hexadiene; 1,5-hexadiene; 4-methyl-1,4-hexadiene; 5-methyl-1,4-hexadiene; 3-methyl-1,5-hexadiene; 3,4-dimethyl-1,5-hexadiene); heptadienes (e.g., 1,3-heptadiene; 1,4-heptadiene; 1,5-heptadiene; 1,6-heptadiene; 6-methyl-1,5-heptadiene); octadienes (e.g., 1,3-octadiene; 1,4-octadiene; 1,5-octadiene; 1,6-octadiene; 1,7-octadiene; 7-methyl-1,6-octadiene; 3,7-dimethyl-1,6-octadiene; 5,7-dimethyl-1,6-octadiene); nonadienes (e.g., 1,8-nonadiene); decadienes (e.g., 1,9-decadiene); undecadienes (e.g., 1,10-undecadiene); dicyclopentadienes; octatrienes (e.g., 3,7,11-trimethyl-1,6,10 octatriene); and combinations thereof.

In some embodiments, the propylene-based polymer in the matrix phase is a polypropylene homopolymer, a polypropylene random copolymer, a polypropylene block copolymer, or a combination thereof. In one embodiment, the propylene-based polymer is a polypropylene homopolymer.

In some embodiments, the propylene-based polymer is a random propylene/α-olefin copolymer. The random propylene/α-olefin (diene) copolymer is a random copolymer of propylene and a minor proportion of one or more α-olefins, dienes, or mixtures thereof. The mixture of one or more α-olefins or dienes can be a mechanical blend or an in-situ blend. In one embodiment, the random propylene/α-olefin (diene) copolymer includes a portion of α-olefin, dienes, or mixtures thereof from about 0.5 wt % to about 10 wt %.

In one embodiment, the random propylene/α-olefin copolymer is a propylene/ethylene copolymer. The propylene/ethylene copolymer may contain from about 0.1 wt % to about 20 wt %, up to about 15 wt %, up to about 10 wt %, or up to about 5 wt % units derived from ethylene.

In some embodiments, the heterophasic copolymer is an impact copolymer polypropylene where the matrix phase is based on propylene and the elastomeric phase is based on ethylene. The impact copolymer results from an in-reactor process rather than physical blending. In one embodiment, the polypropylene impact copolymer may contain ethylene comonomer at the amount of at least 5 wt %, or at least 10 wt %; and/or up to 40 wt %, up to 35 wt %, up to 25 wt %, up to 20 wt %, or up to 15 wt %. In one embodiment, the ethylene content may be present from about 5 wt % to about 40 wt %, from about 5 wt % to about 35 wt %, from about 5 wt % to about 30 wt %, from about 5 wt % to about 25 wt %, from about 5 wt % to about 20 wt %, from about 5 wt % to about 15 wt %, from about 7 wt % to about 30 wt %, from about 7 wt % to about 30 wt %, from about 7 wt % to about 20 wt %, from about 7 wt % to about 15 wt %, from about 10 wt % to about 30 wt %, from about 10 wt % to about 25 wt %, from about 10 wt % to about 20 wt %, or from about 10 wt % to about 15 wt %. The ethylene content may be measured by FTIR or by $^{13}C$ NMR.

In some embodiments, the elastomeric phase (disperse phase) comprises an olefin-based elastomer. Suitable olefins include all those α-olefins described above relating to the comonomers for polymerizing with propylene. For instance, the elastomeric phase (disperse phase) may comprise an elastomer derived from an ethylene, a $C_4$-$C_{10}$ α-olefin, or combinations thereof, wherein the content of the ethylene, $C_4$-$C_{10}$ α-olefin, or combinations thereof may be at up to about 100 wt %, up to about 99 wt %, up to about 95 wt %, up to about 90 wt %, up to about 85 wt %, up to about 80 wt %, from about 1 to 80 wt %, from about 5 to 80 wt %, from about 10 to 80 wt %, from about 15 to 80 wt %, from about 30 to 70 wt %, or from about 35 to 65 wt %.

In one embodiment, the elastomeric phase (disperse phase) comprises an ethylene-based elastomer. For instance, the elastomeric phase may be a propylene ethylene copolymer having an ethylene content of up to about 99 wt %, up to about 95 wt %, up to about 90 wt %, up to about 85 wt %, up to about 80 wt %, from about 1 to 80 wt %, from about 5 to 80 wt %, from about 10 to 80 wt %, from about 15 to 80 wt %, or from about 30 to 70 wt %.

In some embodiments, the propylene-based polymer has a melt index ("MI"), or a melt flow rate ("MFR"), from about 0.5 g/10 min to about 150 g/10 min, from about 1 g/10 min to about 100 g/10 min. The propylene-based polymer has a density from about 0.85 g/cc to about 0.95 g/cc. The melt flow rate for the propylene-based polymer is measured at 230° C. with a 2.16 kg melt indexer weight, in accordance with ASTM D 1238.

In some embodiments, the olefin-based elastomer is an ethylene-based elastomer and has a melt flow rate from about 0.5 g/10 min to about 30 g/10 min. The ethylene-based elastomer has a density from about 0.85 g/cc to about 0.91 g/cc, or from about 0.86 g/cc to about 0.888 g/cc. In one embodiment, the ethylene-based elastomer has a density less than 0.885 g/cc or less than 0.880 g/cc. The melt flow rate for the olefin-based elastomer is measured at 190° C. with a 2.16 kg melt indexer weight, in accordance with ASTM D 1238.

Overall, the heterophasic copolymer has a melt flow rate from about 0.1 to 150 g/10 min, from about 1 to 100 g/10 min, from about 1 to 50 g/10 min, from about 1 to 40 g/10 min, from about 1 to 20 g/10 min, or from 3 to 10 g/10 min. The melt flow rate is measured at 230° C. with a 2.16 kg melt indexer weight, in accordance with ASTM D 1238.

In some embodiments, the heterophasic copolymer, having the fibers (e.g., first fiber) present therein, has a melt flow rate of from about 0.1 to 50 g/10 min, from about 0.5 to 50 g/10 min, from about 1 to 50 g/10 min, from about 2 to 50 g/10 min, from about 0.5 to 40 g/10 min, from about 1 to 20 g/10 min, from about 2 to 8 g/10 min, from about 2 to 6.5 g/10 min, or from 3 to 10 g/10 min. The melt flow rate is measured at 230° C. with a 2.16 kg melt indexer weight, in accordance with ASTM D 1238. When the melt flow rate is too high, the fiber-blended heterophasic copolymer may have a viscosity that is too low, and does not have sufficient melt strength. When the melt flow rate is too low, the fiber-blended heterophasic copolymer may be difficult to process as an additive-manufacture feedstock because the pressure can become too high to push through the printer nozzle.

The additive-manufacture feedstock comprises the heterophasic copolymer in an amount of from about 40 to 99 wt %, relative to 100 wt % of the additive-manufacture feedstock. For instance, the heterophasic copolymer is present in the additive-manufacture feedstock in an amount of from about 60 to 97 wt %, from about 60 to 96 wt %, from about 65 to 96 wt %, from about 70 to 96 wt %, from about 75 to 96 wt %, from about 80 to 96 wt %, from about 85 to 96 wt %, from about 88 to 96 wt %, from about 60 to 95 wt %, from about 65 to 95 wt %, from about 70 to 95 wt %, from about 75 to 95 wt %, from about 80 to 95 wt %, from about 85 to 95 wt %, from about 90 to 95 wt %, or from about 70 to 80 wt %, relative to 100 wt % of the additive-manufacture feedstock.

The additive-manufacture feedstock further comprises one or more fibers (e.g., a first fiber) blended in the heterophasic copolymer. The fibers (e.g., first fiber) may be present in an amount of from about 1.0 to 40 wt %, relative to 100 wt % of the additive-manufacture feedstock. For instance, the fibers (e.g., first fiber) may be present in the additive-manufacture feedstock in an amount of from about 3 to 40 wt %, from about 4 to 40 wt %, from about 4 to 35 wt %, from about 4 to 30 wt %, from about 4 to 25 wt %, from about 4 to 20 wt %, from about 4 to 15 wt %, from about 4 to 12 wt %, from about 5 to 40 wt %, from about 5 to 35 wt %, from about 5 to 30 wt %, from 5 to 25 wt %, from 5 to 20 wt %, from about 5 to 15 wt %, from about 5 to 10 wt %, or from about 20 to 30 wt %, relative to 100 wt % of the additive-manufacture feedstock.

The fibers (e.g., first fiber) to be blended in the additive-manufacture feedstock can include any fiber types suitable for reinforcement of the heterophasic copolymer. Exemplary fiber materials are glass fibers, carbon fibers, metal fibers, ceramic fibers, natural fibers, organic fibers, or a combination thereof. In one embodiment, the first-fiber is a natural fiber, carbon fiber, glass fiber, or a combination thereof.

The term "fiber" as referred herein is defined by an aspect ratio, calculated by dividing the fiber length by its diameter, of about 3-500. In one embodiment, the fiber (e.g., first fiber) to be blended in the additive-manufacture feedstock has an aspect ratio of at least 10. The fibers (e.g., first fiber) to be blended in the additive-manufacture feedstock typically have a length of about 10 to 10,000 µm. When the lengths of the fibers are too short, the ability of reinforcement can be affected. On the other hand, when the lengths of the fibers are too long, the fibers can be difficult to process during extrusion for preparing the feedstock. In one embodiment, the first-fiber in the additive-manufacture feedstock has a length of from about 100 to 600 µm.

The additive-manufacture feedstock can further comprise a sizing agent compatible with the first-fiber-blended heterophasic copolymer. The sizing agents can be used in the additive-manufacture feedstock in various ways. For instance, the sizing agent can be chemically bonded to the fibers. Alternatively, the sizing agents can also be coated on the fibers. The sizing agent can also be blended with the fibers and the heterophasic copolymer, functioning as a compatibilizer.

The amount of sizing agents used with the fibers can range from about 0.01 wt % to about 5 wt %, from about 0.05 wt % to about 3 wt %, from about 0.1 wt % to about 3 wt %, or from about 0.5 wt % to about 1 wt %, relative to 100 wt % of the fibers in the additive-manufacture feedstock.

Suitable sizing agents for surface treatment of fibers (such as glass or carbon fibers) include those known to one skilled in the art. As used herein, the terms "size," "sizing," and "sizing agent" are interchangeable and refer to a composition that can be applied to fibers (such as glass or carbon fibers) shortly after their formation. The fibers (such as glass or carbon fibers) sized in accordance with the present invention are compatible with the thermoplastic matrix polymers such as polyolefin matrices and in particular, polypropylene. A heterophasic copolymer reinforced with the sized fibers (such as glass or carbon fibers) can exhibit improved dispersion of the fibers (such as glass or carbon fibers) in the heterophasic copolymer.

The sizing agents can comprise, consist essentially of, consist of, have, or be, an acid-modified propylene polymer, the polymer of acid-modified propylene polymer being a homopolypropylene or a copolymer of propylene with another α-olefin. Homopolymers of propylene exist in both amorphous and crystalline form (the latter sometimes called isotactic or stereoregular polypropylene). Either of these homopolymers of propylene can be modified for use in this invention. Likewise, propylene can be copolymerized with ethylene and/or another α-olefin to yield amorphous or crystalline copolymers. Typical copolymers in addition to that prepared with ethylene are those prepared with butene-1 and the terpolymer prepared from propylene, ethylene and a diene such as dicyclopentadiene.

When an acid-modified propylene polymer is used for the sizing agents, the acid modification of the polymer can be effected with an ethylenically substituted polycarboxylic acid or an anhydride, amide, or lower alkyl ester thereof, which has its ethylenic unsaturation on a C atom in a position alpha to at least one carboxyl group or potential carboxyl group. The preferred modifiers are the derivatives of unsaturated dicarboxylic acids having four carbon atoms in the longest straight chain beginning and ending with a carboxyl group or potential carboxyl group. Examples of such acid derivatives include unsaturated dicarboxylic acids such as maleic acid, itaconic acid, citraconic acid, fumaric acid, mesaconic acid, maleamic acid; anhydrides of such acids such as maleic anhydride, itaconic anhydride, citraconic anhydride, fumaric anhydride, mesaconic anhydride; amides of such acids, such as maleimide, maleamide; monoalkyl or dialkyl esters of such acids wherein the alkyl moiety has 1 to 18 carbon atoms (e.g., methyl, ethyl, propyl, butyl, etc.), such as monoalkyl or dialkyl citraconate, monoalkyl or dialkyl maleate, monoalkyl or dialkyl itaconate, monoalkyl or dialkyl fumarate, and the like. A typical sizing agent for fibers (particularly carbon fibers) is maleic anhydride modified (or maleated) polypropylene.

The sizing agents can include multifunctional epoxy resin such as bisphenol A epoxy resin, bisphenol F epoxy resin, aliphatic epoxy resin, and phenol novolac epoxy resin. Typically used epoxy resins are aliphatic epoxy resins that easily exhibit adhesion to the thermoplastic matrix polymers. Suitable aliphatic epoxy resins include the diglycidyl ether compounds such as ethylene glycol diglycidyl ether and polyglycol ethylene glycol diglycidyl ether, propylene glycol diglycidyl ether and polypropylene glycol diglycidyl ether, 1,4-butanediol diglycidyl ether, neopentyl glycol diglycidyl ether, polytetramethylene glycol diglycidyl ether, polyalkylene glycol diglycidyl ether, etc.; and the polyglycidyl ether compounds such as glycerin polyglycidyl ether, diglycerin polyglycidyl ether, polyglycerol polyglycidyl ether, sorbitol polyglycidyl ether, arabinitol polyglycidyl ether, trimethylolpropane polyglycidyl ether, trimethylolpropane glycidyl ether, neopentyl alcohol polyglycidyl ether, aliphatic polyol polyglycidyl ether, etc.

The sizing agents can also include a siloxane, a silane, or a combination thereof. Examples include aminopropyltrimethoxysilane (APTES), trichlorovinylsilane (TCVS), (3-Glycidyloxypropyl)trimethoxysilane (GPTMS), (3-Mercaptopropyl)trimethoxysilane (MPTMS), and vinyltrimethoxysilane (VTMS), and polyalkylsiloxanes, such as polydimethylsiloxane. These silica-based sizing agents can be particularly useful as sizing for glass fibers.

A compatibilizer can be used to be blended with the fibers and the heterophasic copolymer in the additive-manufacture feedstock, separate from the surface treatment of the fibers by the sizing agents. Suitable compatibilizers include all the sizing agents described above.

The additive-manufacture feedstock can further comprise an additive, other than the fibers (e.g., first-fiber). Suitable additives include but not limited to a sliding agent; an inorganic filler or a reinforcement; an antioxidant (e.g., a hindered phenol antioxidant, sulfur-containing compound-based antioxidant, or phosphorus-containing organic compound-based antioxidants; a pigment (or a dye); an adhesion-promoting agent, a biocide (e.g., an antibacterial, fungicide, or mildewcide), a whitening agent, a nucleating agent (or an auxiliary agent that promotes crystallization), an anti-static agent, an anti-blocking agent, a processing aid, a flame-retardant (e.g., a brominated compound, phosphate, or red phosphorus), a plasticizer (e.g., phthalates and phosphate), a heat stabilizer (e.g., a phenol heat stabilizer or acrylate heat stabilizer), a UV absorber (e.g., a benzotriazole-based UV absorber, benzophenone-based UV absorber, or salicylate-based UV absorber), a light stabilizer (e.g., an organic nickel-based light stabilizer or hindered amine-based light stabilizer), a polyethylene, a polypropylene, an elastomer, a thermoplastic polyurethane, and combinations thereof.

A sliding agent can be incorporated into the first-fiber blended heterophasic copolymer to improve elongation, toughness, and printability, through techniques known in the art. Suitable sliding agents include but are not limited to mineral oils; glycerol esters such as glycerol monostearate or glycerin monostearate glycerol; polyethers such as polypropylene glycol or polyethylene glycol; fluoropolymers; silanes; fatty acid amides such as oleoamides or eurucamide; and mixtures thereof. The amount of the sliding agent present in the additive-manufacture feedstock can range from about 0.05 to 3 wt %, from about 0.1 to 3 wt %, or from about 0.5 to 1 wt %, relative to 100 wt % of the additive-manufacture feedstock.

Suitable inorganic fillers include, but are not limited to, talc, marble dust, cement dust, clay, carbon black, feldspar, silica, glass, fumed silica, silicate, calcium silicate, silicic acid powder, glass microspheres, mica, metal oxide particles and nanoparticles such as magnesium oxide, antimony oxide, zinc oxide, barium sulfate, wollastonite, alumina, aluminum silicate, a titanium oxide, calcium carbonate, a polyhedral oligomeric silsesquioxane, and combinations thereof Additive-Manufacture Feedstock and its Preparation The additive-manufacture feedstock described herein to be supplied for 3D printing can be in various forms or shapes, such as filaments (or rods, strands, etc.), powder or pellets, or a distribution of powders or pellets (e.g., solid or liquid suspensions, such as in a slurry/paste/clay or solid mixture form).

The additive-manufacture feedstock described herein as a consumable product may be prepared as a consumable product in the form of an extruded article. When in the extruded article form, the fiber-blended heterophasic copolymer in the additive-manufacture feedstock can exhibit a minimized warpage. For instance, the feedstock, when forming into a printed article, may have a warpage resistance rating of at most 1 mm, measured according to the following equation and 48 hours after printing the printed article:

$$\text{warpage resistance rating} = \frac{\sum_{i=1}^{N} WS_i}{N}$$

The variables in this warpage resistance rating equation and the measurement conditions are the same as those described above in the aspect of the invention relating to an additive-manufacture feedstock.

When in the extruded article form, the fiber-blended heterophasic copolymer in the additive-manufacture feedstock has a hardness of at least about 60 Shore A, at least about 70 Shore A, at least about 80 Shore A, or at least about 85 Shore A for processability threshold of 3D printing. In Shore C scale, the fiber-blended heterophasic copolymer in the additive-manufacture feedstock has a hardness of at least about 28 Shore C, at least about 37 Shore C, at least about 47 Shore C, or at least about 52 Shore C. When the hardness is lower than the threshold value, the filaments or pellets can become too flexible to be fed to the printer nozzle.

Some embodiments of the invention relate to a filament formed from the additive-manufacture feedstock described above. For instance, the additive-manufacture feedstock material may be extruded in a filament having a constant diameter. In some embodiments, the diameter of the filament ranges from 1 to 5 mm. For instance, the diameter of the filament may be 1.75 mm or 2.85 mm. Filaments with other diameters can also be extruded and used. The variation from the nominal diameter may be ±0.05 mm, or ±0.03 mm.

The resulting filament of the additive-manufacture feedstock may be wound on a spool that may be connected to a 3D printer for printing. The length of the filament is unlimited and depends on the need and practicality for the supply. Typically, the filament may have a length of about 0.1 to 50000 meters.

Some embodiments of the invention relate to a distribution (e.g., suspension) of pellets (or powders), each pellet (or powder) formed from the additive-manufacture feedstock described above. For instance, the additive-manufacture feedstock material may be extruded into powders or pellets. The distribution (e.g., suspension) of the additive-manufacture feedstock may exist as solid or liquid suspensions of powders or pellets, e.g., in a slurry/paste/clay form, or in a solid mixture form. The distribution (e.g., suspension) of pellets (or powders) can be supplied to a 3D printer for printing. The distribution (e.g., suspension) of pellets (or powders) may have a count of 5 to 60 pellets per gram of the distribution, for instance, a count of 5 to 20 pellets per gram of the distribution, or a count of 30 to 60 pellets per gram of the distribution.

When forming the extruded article, the additive-manufacture feedstock is extruded by means known in the art using an extruder or other vessel apparatus. The term "extruder" takes on its broadest meaning and, includes any machine suitable for heterophasic copolymer extrusion. For instance, the term includes machines that can extrude the additive-manufacture feedstock in the form of powder or pellets, rods, strands, fibers or filaments, sheets, or other desired shapes and/or profiles. Generally, an extruder operates by feeding the feedstock material through the feed throat (an opening near the rear of the barrel) which comes into contact with one or more screws. The rotating screw(s) forces the feedstock material forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front.

The vessel can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

When a melt extrusion is used, the temperature and conditions for extruding the additive-manufacture feedstock may be different according to the type of the heterophasic copolymer.

Another aspect of the invention relates to a method of making an additive-manufacture feedstock. The method comprises: blending a heterophasic copolymer having a melt flow rate of from 0.1 to 150 g/10 min (230° C./2.16 kg), measured according to ASTM D 1238, and a first-fiber to form an additive-manufacture feedstock comprising the first-fiber-blended heterophasic copolymer. The first-fiber is present in the additive-manufacture feedstock in an amount of from 1.0 to 40 wt %, relative to 100 wt % of the additive-manufacture feedstock. The first-fiber-blended heterophasic copolymer, when in the form of a printed article, exhibits a warpage resistance rating of at most 1 mm, measured according to the following equation and 48 hours after printing the printed article $$\text{warpage resistance rating} = \frac{\sum_{i=1}^{N} WS_i}{N}$$

All above descriptions and all embodiments discussed in the above aspect relating to the additive-manufacture feedstock, including various aspects of the heterophasic copolymer; the fibers (e.g., first-fiber); the sizing agents; other additives; and the amounts used thereof; and the variables in the warpage resistance rating equation and the measurement conditions for the warpage resistance rating equation are applicable to this aspect of the invention relating to a method of making an additive manufacture feedstock.

In some embodiments, the disclosure provides a method of making an extruded article for three-dimensional printing with minimized warpage. The method comprises blending a heterophasic copolymer having a melt flow rate of from 0.1 to 150 g/10 min (230° C./2.16 kg), measured according to ASTM D 1238, and a first-fiber to form an additive-manufacture feedstock comprising the first-fiber-blended heterophasic copolymer, wherein the first-fiber is present in an amount of from 1.0 to 40 wt %, relative to 100 wt % of the additive-manufacture feedstock. The method further comprises heating the additive-manufacture feedstock to a molten state, and extruding the additive-manufacture feedstock to form an extruded article. The first-fiber-blended heterophasic copolymer in the extruded article exhibits a minimized warpage resistance rating, when forming into a printed article, of at most 1 mm, measured according to the above warpage resistance rating equation.

The method described herein selects the components for the additive-manufacture feedstock by balancing the melt flow rate of the fiber-filled heterophasic copolymer composite, the constituents of the heterophasic copolymer, and the fiber loading to result in a consumable additive-manufacture feedstock product. The product has a hardness and toughness that can be easily fed to the 3D printer nozzle and withstand normal wear and tear of handling on a filament spool. It should not clog the nozzle of the 3D printer (e.g., a nozzle of a 0.4 mm diameter) and has a minimized warpage issue in the 3D-manufactured article.

3D Printing Using the Additive-Manufacture Feedstock

Another aspect of the invention relates to a method of three-dimensional printing. The method comprises: (1) supplying the additive-manufacture feedstock as described from the above aspect of the invention to a printing apparatus and forming a hot-melt of the additive-manufacture feedstock; (2) depositing the hot-melt of the additive-manufacture feedstock from the printing apparatus on a substrate to form a first deposited printing layer; (3) repeating (1) and (2) to deposit a second printing layer on the first printing layer; and (4) optionally depositing at least one further printing layer on said second printing layer.

All above descriptions and all embodiments discussed in the above aspect relating to the additive-manufacture feedstock, including various aspects of the heterophasic copolymer, the fibers (e.g., first-fiber), the sizing agents, other additives, and the amounts used thereof, are applicable to this aspect of the invention relating to a method of three-dimensional printing.

Additionally, all above descriptions and all embodiments discussed in the above aspect relating to the method of making an additive-manufacture feedstock or the method of producing an extruded article for three-dimensional printing with minimized warpage are also applicable to this aspect of the invention relating to a method of three-dimensional printing.

The printing apparatus (i.e., the 3D printer) can employ various 3D printing technologies known in the art. In some embodiments, the printing apparatus employs an extrusion-based 3D printing technology. For instance, an extrusion-based 3D printer may be used to build a 3D model from a digital representation of the 3D model in a layer-by-layer manner by extruding a flowable modeling additive-manufacture feedstock.

In one embodiment, the printing apparatus employs a fused filament fabrication (FFF) (or fused deposition modelling, FDM) method. In an exemplary embodiment, a filament of the additive-manufacture feedstock is extruded through an extrusion tip carried by an extrusion head and deposited as a sequence of roads on a substrate in an x-y plane. The extruded additive-manufacture feedstock fuses to previously deposited additive-manufacture feedstock and solidifies upon decreasing temperature. The position of the extrusion head relative to the substrate is then incremented along a z-axis (perpendicular to the x-y plane), and the process is then repeated to form a 3D model resembling the digital representation. Movement of the extrusion head with respect to the substrate is performed under computer control, in accordance with build data that represents the 3D model. The build data is obtained by slicing the digital representation of the 3D model into multiple horizontally sliced layers. For each sliced layer, the host computer generates a build path for depositing roads of modeling material to form the 3D model.

In one embodiment, the printing apparatus employs a fused particle fabrication (FPF) (or fused granular fabrication, FGF) method.

The additive-manufacture feedstock may be supplied to the printing apparatus in various forms or shapes, such as filaments (or rods, strands, etc.), powder or pellets, or a distribution (e.g., solid or liquid suspensions, such as in a slurry/paste/clay or solid mixture form) of powders or pellets, as discussed above.

The supplied additive-manufacture feedstock is then printed, according to the modeling based on the 3D method (e.g., FFF or FPF model), by first forming a hot-melt of the additive-manufacture feedstock (at a temperature above the melting point and/or softening point of one or more components of the additive-manufacture feedstock), and then depositing the hot-melt of the additive-manufacture feedstock from the printing apparatus on a substrate to form a first deposited printing layer. The hot-melt of the additive-manufacture feedstock may be formed by extruding the additive-manufacture feedstock through the printing apparatus.

The supplying and depositing steps are repeated to deposit a second printing layer and further printing layer(s) on the first printing layer, until a printed article according to the 3D model is obtained.

The deposited printing layer(s) or final printed article may be solidified by a method known in the art. For instance, the deposited printing layer or final printed article may be further treated by sintering, hydrating, coating, melting, infiltrating, freezing, crystallizing, precipitating and/or crosslinking.

EXAMPLES

The following examples are for illustrative purposes only and are not intended to limit, in any way, the scope of the present invention.

Example 1—Additive-Manufacture Feedstock Having Heterophasic Polypropylene Copolymer Blended with Carbon Fiber A commercially available Braskem heterophasic polypropylene impact copolymer, having a disperse phase within 10-50 wt % based on an ethylene-based elastomer, and a melt flow rate of 9 g/10 min, measured according to ASTM D 1238 (230° C./2.16 kg), in the form of pellets was used as the base matrix. A carbon fiber coated in maleic anhydride grafted polypropylene was blended with the heterophasic polypropylene impact copolymer, with a loading of the carbon fiber at 5-15 wt %.

Tests of filament production and 3D printing by Fused Filament Fabrication (FFF) technology with produced filaments were conducted with these fiber-blended heterophasic copolymer samples.

The fiber-blended heterophasic copolymers were extruded at 190° C. through a single screw extruder to form a filament having a constant diameter of 1.75 mm (±0.05) or 2.85 mm (±0.05). The filament obtained was wound on a spool that may be connected to the 3D printer.

Figure 2:
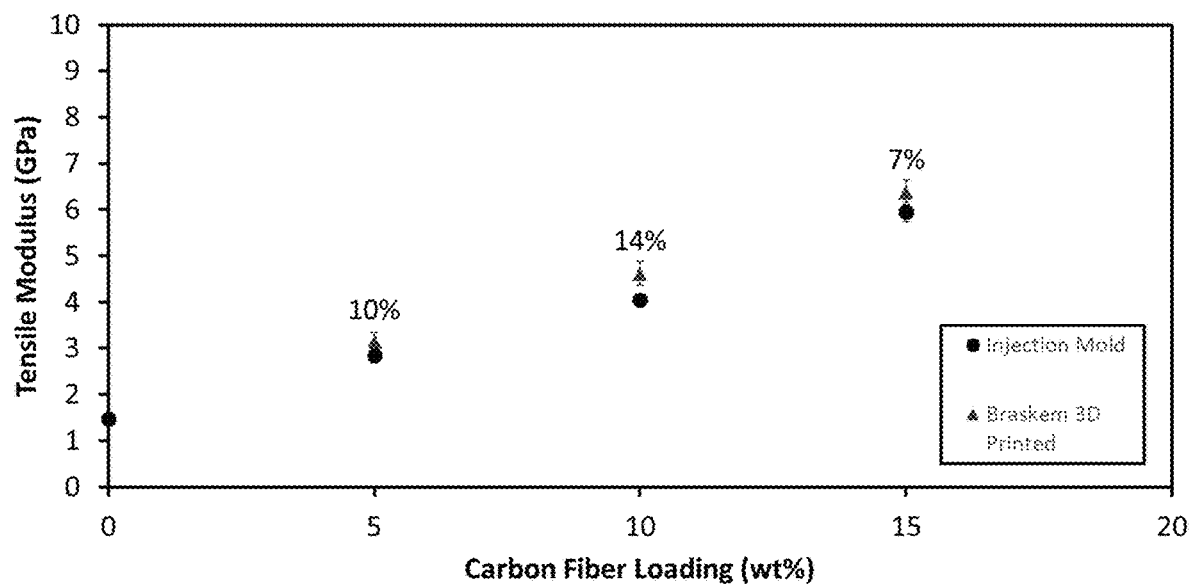
FIG. 2 shows the results of the tensile modulus of the objects made from 3D printing technique as compared to that of the objects made from injection mold technique, as a function of carbon fiber loading. The feedstock used was an exemplary additive-manufacture feedstock having a heterophasic polypropylene copolymer blended with carbon fibers, as described in Example 1. The numbers above each set of data points are % difference between 3D-printed samples and injection molded samples.
Figure 3:
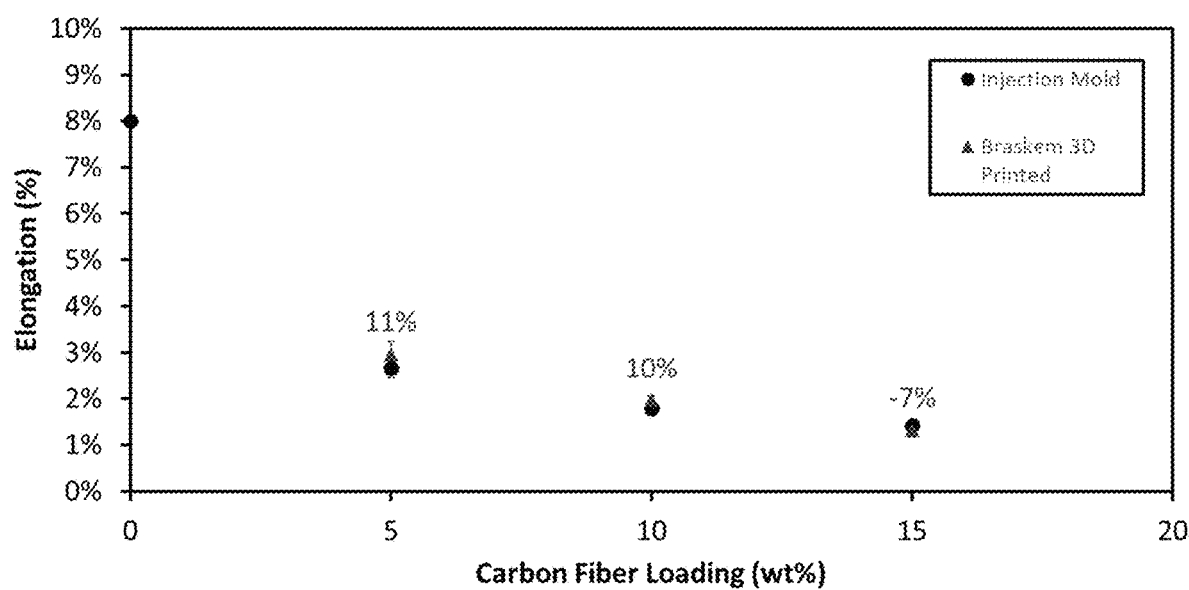
FIG. 3 shows the results of the elongation of the objects made from 3D printing technique as compared to that of the objects made from injection mold technique, as a function of carbon fiber loading. The feedstock used was an exemplary additive-manufacture feedstock having a heterophasic polypropylene copolymer blended with carbon fibers, as described in Example 1. The numbers above each set of data points are % difference between 3D-printed samples and injection molded samples.

The filament was then loaded to a Fused Filament Fabrication based desktop 3D printer Ultimaker S5 (Ultimaker), and printed with the following print parameters:

Nozzle diameter—0.6 mm
Printing temperature—260° C.
Bed Temperature Initial—100° C.
Bed temperature—85° C.
Thickness of layer—0.2 mm
Print speed—45 mm/s The mechanical performance of the 3D printed objects, using the fiber-blended heterophasic copolymers as the additive manufacture feedstock, was tested at interfacial. The mechanical performance of objects produced using conventional injection mold technique, employing the same fiber-blended heterophasic copolymers as the feedstock with the same fiber loading, was also tested as comparative results. The results comparing the objects made from 3D printing technique as compared against the objects made from injection mold technique are summarized in FIGS. 1-3. As shown in FIG. 1 and FIG. 2, employing the fiber-blended heterophasic copolymers as the feedstock with the carbon fiber loading of 5-15 wt %, the objects made from 3D printing technique generally provided comparable or improved tensile properties (tensile strength and tensile modulus) than the objects made from injection mold technique. FIG. 3 shows that, employing the fiber-blended heterophasic copolymers as the feedstock with the carbon fiber loading of 5-10 wt %, the objects made from 3D printing technique provided improved elongation than the objects made from injection mold technique.

Figure 4A:
FIGS. 4A and 4B represent the 3D print of the objects using an exemplary additive-manufacture feedstock having a heterophasic polypropylene copolymer blended with carbon fibers, as described in Example 1, demonstrating a high degree of printability of the inventive additive-manufacture feedstock for 3D printing of a complex part.
Figure 4B:

FIGS. 4A and 4B show an article printed from 3D printing using the additive-manufacture feedstock described in this example. As shown in the figures, the printed object is a highly complex part, demonstrating a high degree of printability of the inventive additive-manufacture feedstock for 3D printing of a complex part.

Example 2—Method for Measuring the Warpage Resistance Rating

To evaluate the warpage resistance rating of an additive-manufacture feedstock in the form of a printed article (whether an inventive additive-manufacture feedstock or a comparative additive-manufacture feedstock), a number of specimens are printed and measured. In this example, three specimens are printed and measured for the warpage resistance rating evaluation.

Figure 5A:
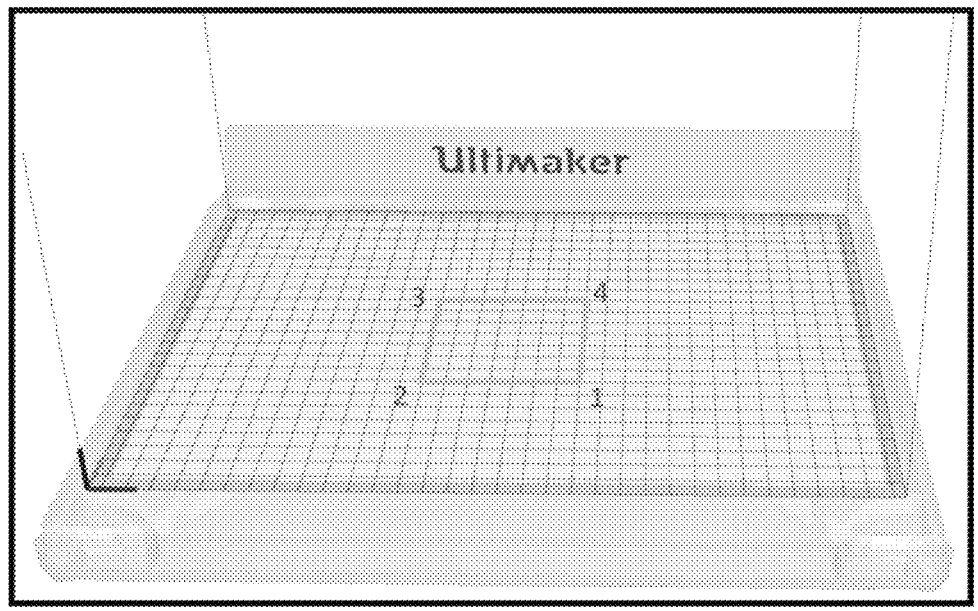
FIGS. 5A-5D illustrate the method of measuring the warpage resistance rating.

Three 60 mm×60 mm×60 mm, open-ended boxes are printed with the additive-manufacture feedstock to be evaluated. For each printing, the print orientation is X-Y, as shown in FIG. 5A. The thickness of each wall is 1 mm.

Figure 5B:
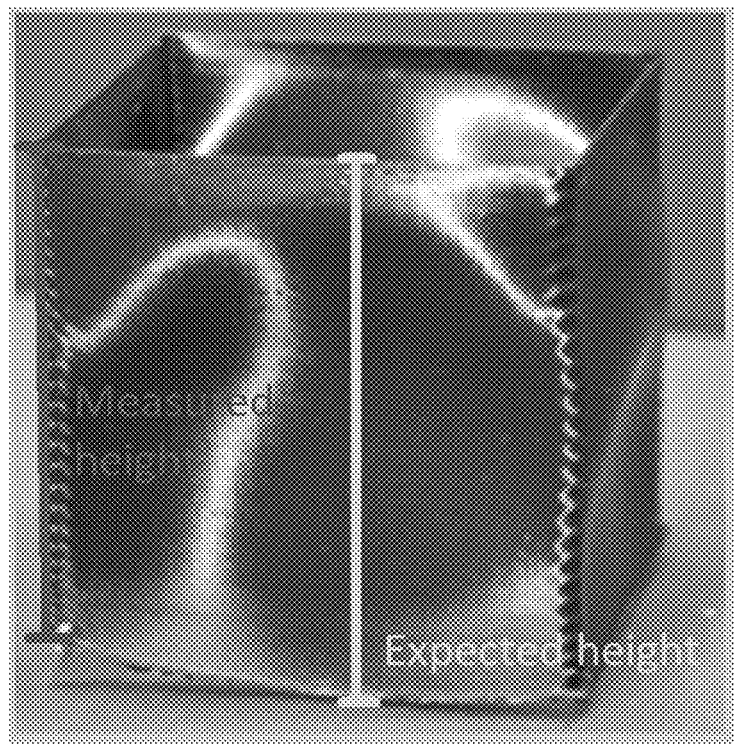

The printing program used to print each specimen develops a model of the specimen to be printed, and the expected height for any edge of the object is defined the model. FIG. 5B shows one printed open-ended, thin-walled box, which overlays the expected height of one edge from the model. FIG. 5B also shows the measured height of the printed open-ended, thin-walled box for the same edge.

Figure 5C:
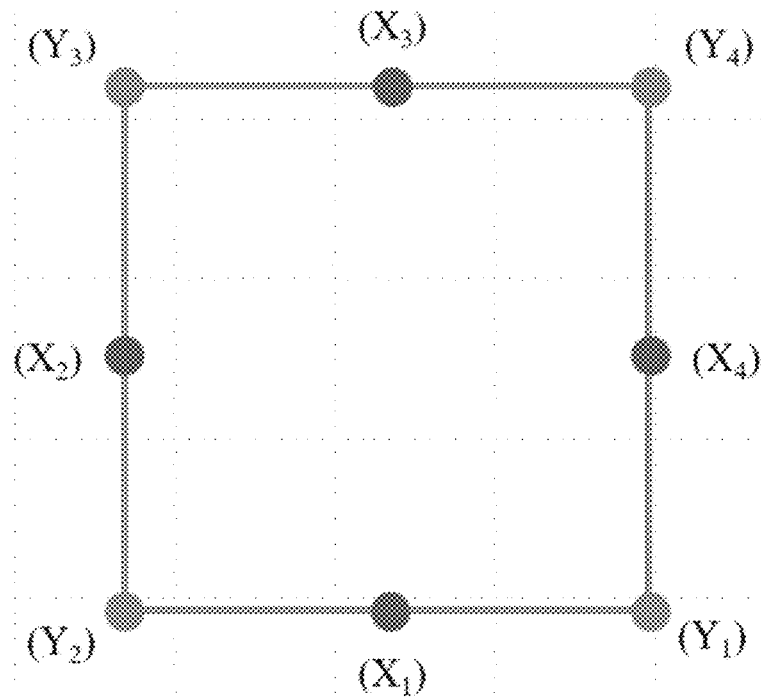

For the purpose of evaluating the warpage resistance rating, FIG. 5C illustrates an exemplary box projecting onto the X-Y plane and identifying the locations for $X_1$, $X_2$, $X_3$, and $X_4$, and $Y_1$, $Y_2$, $Y_3$, and $Y_4$. Each location of $X_1$, $X_2$, $X_3$, and $X_4$ represents a central edge of a box, wherein the central edge is found at the center point of a sidewall of the box, e.g., at 30 mm, ±0.5 mm, from a corner edge. Each location of $Y_1$, $Y_2$, $Y_3$, and $Y_4$ represents a corner edge of a box.

To evaluate the warpage resistance rating of a particular feedstock, each of the printed three boxes are reviewed, and the height of the printed object on each locations of $X_1$, $X_2$, $X_3$, and $X_4$ and $Y_1$, $Y_2$, $Y_3$, and $Y_4$ are measured and recorded. The measurements are done 48 hours after the boxes are printed. For each of the three boxes, the heights of the central edges from all sidewalls, i.e., the heights at the locations of $X_1$, $X_2$, $X_3$, and $X_4$, are compared and the greatest height (or the greatest value from $X_1$, $X_2$, $X_3$, and $X_4$) is identified and recorded. For each of the three boxes, the heights of the corner edges from all sidewalls, i.e., the heights at the locations of $Y_1$, $Y_2$, $Y_3$, and $Y_4$, are compared and the shortest or least height (or the smallest value from $Y_1$, $Y_2$, $Y_3$, and $Y_4$) is identified and recorded. Thereafter, the warpage value, WS, for each box is determined. The warpage values for boxes 1, 2, and 3, are $WS_1$, $WS_2$, and $WS_3$, respectively.

The warpage resistance rating is thus given by the following equation:

$$\text{warpage resistance rating} = \frac{WS_1 + WS_2 + WS_3}{N}$$

In the equation, N is the total number of printed articles measured for warpage resistance rating evaluation. In this case, N is 3.

$WS_1$=Max $(X_1, X_2, X_3, X_4)_1$–Min $(Y_1, Y_2, Y_3, Y_4)_1$ for a first printed box.

$WS_2$=Max $(X_1, X_2, X_3, X_4)_2$–Min $(Y_1, Y_2, Y_3, Y_4)_2$ for a second printed box.

$WS_3$=Max $(X_1, X_2, X_3, X_4)_3$–Min $(Y_1, Y_2, Y_3, Y_4)_3$ for a third printed box.

As noted above, $X_1$, $X_2$, $X_3$, and $X_4$, respectively, represent a height of a first central edge, a height of a second central edge, a height of a third central edge, and a height of a fourth central edge, for each of the first, second, and third printed box. $Y_1$, $Y_2$, $Y_3$, and $Y_4$, respectively, represent a height of a first corner edge, a height of a second corner edge, a height of a third corner edge, and a height of a fourth corner edge, for each of the first, second, and third printed box.

Accordingly, Max $(X_1, X_2, X_3, X_4)_1$ represents the maximum value of $X_1$, $X_2$, $X_3$, and $X_4$, for the first printed box. Max $(X_1, X_2, X_3, X_4)_2$ represents the maximum value of $X_1$, $X_2$, $X_3$, and $X_4$, for the second printed box. Max $(X_1, X_2, X_3, X_4)_3$ represents the maximum value of $X_1$, $X_2$, $X_3$, and $X_4$, for the third printed box. Min $(Y_1, Y_2, Y_3, Y_4)_1$ represents the minimum value of $Y_1$, $Y_2$, $Y_3$, and $Y_4$, for the first printed box. Min $(Y_1, Y_2, Y_3, Y_4)_1$ represents the minimum value of $Y_1$, $Y_2$, $Y_3$, and $Y_4$, for the second printed box. Min $(Y_1, Y_2, Y_3, Y_4)_1$ represents the minimum value of $Y_1$, $Y_2$, $Y_3$, and $Y_4$, for the third printed box.

Figure 5D:
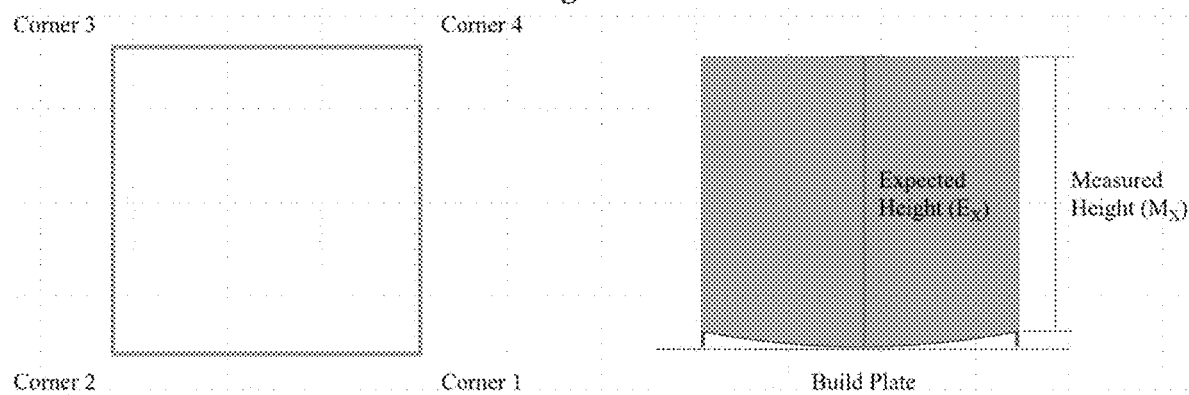

FIG. 5D provides another view and illustration for a hypothetical box for which the warpage resistance is determined according to the above equation. As shown in the right view of FIG. 5D, the heights of the central and corner edges are measured from the bottom edge of the box that touches the build plate, not from the build plate itself. Because the thermodynamic warpage typically occurs the least in the center edge of the box, the height measured at the center edge for each sidewall of the printed box mostly corresponds to the expected height defined by the model; whereas the height measured at the corner edge for each sidewall of the printed box often records the highest possible warp, because the thermodynamic warpage is typically its highest at sharp corners where stresses are concentrated. Accordingly, in the equation above, Max $(X_1, X_2, X_3, X_4)$ would record a value approximate the expected height defined by the model $(E_x)$, and Min $(Y_1, Y_2, Y_3, Y_4)$ would record the lowest measured height $(M_x)$. The warpage calculated for each printed box, WS, would therefore be determined from a measured height that has the greatest difference from the expected height. The average value of the WS values determined for all three boxes would be the warpage resistance rating of that particular feedstock used to print the boxes.

Example 3—Measurements of the Warpage Resistance Rating

To illustrate the minimized warpage exhibited by the additive-manufacture feedstock according to this invention, the warpage resistance rating of the inventive additive-manufacture feedstock in the form of a printed article was determined, and compared against the warpage resistance rating of two comparative additive-manufacture feedstock. The warpage resistance rating for the inventive additive-manufacture feedstock and the two comparative additive-manufacture feedstock were determined based on the method described in Example 2.

The inventive additive-manufacture feedstock was prepared according to Example 1. A commercially available Braskem heterophasic polypropylene impact copolymer, having a disperse phase of about 28 wt % (estimated by the amorphous content measured by xylene soluble content on polypropylene, according to ASTM D5492-17) based on an ethylene-based elastomer, and a melt flow rate of 9 g/10 min, measured according to ASTM D 1238 (230° C./2.16 kg), in the form of pellets was used as the base matrix. A carbon fiber coated in maleic anhydride grafted polypropylene was blended with the heterophasic polypropylene impact copolymer, with a loading of the carbon fiber at 15 wt %. The fiber-blended heterophasic copolymers were extruded at 190° C. through a single-screw extruder to form a filament having a constant diameter of 2.85 mm (±0.05). The filament obtained was wound on a spool that may be connected to the 3D printer. The filament from the additive-manufacture feedstock is labeled as Sample 1.

Two commercially available additive-manufacture feedstock in a form of filament were obtained for comparison on the warpage resistance of the feedstock material. Sample 2 is a commercially available 3D printing filament by Owens Corning (Owens Corning XSTRAND GF30-PP) made of glass fiber-filled polypropylene containing 30% glass fiber, having diameter of 2.85 mm (±0.05). Sample 3 is a commercially available 3D printing filament by BASF (BASF Innofil GF30) made of glass fiber-filled polypropylene containing 30% glass fiber, having diameter of 2.85 mm (±0.05).

Figure 6A:
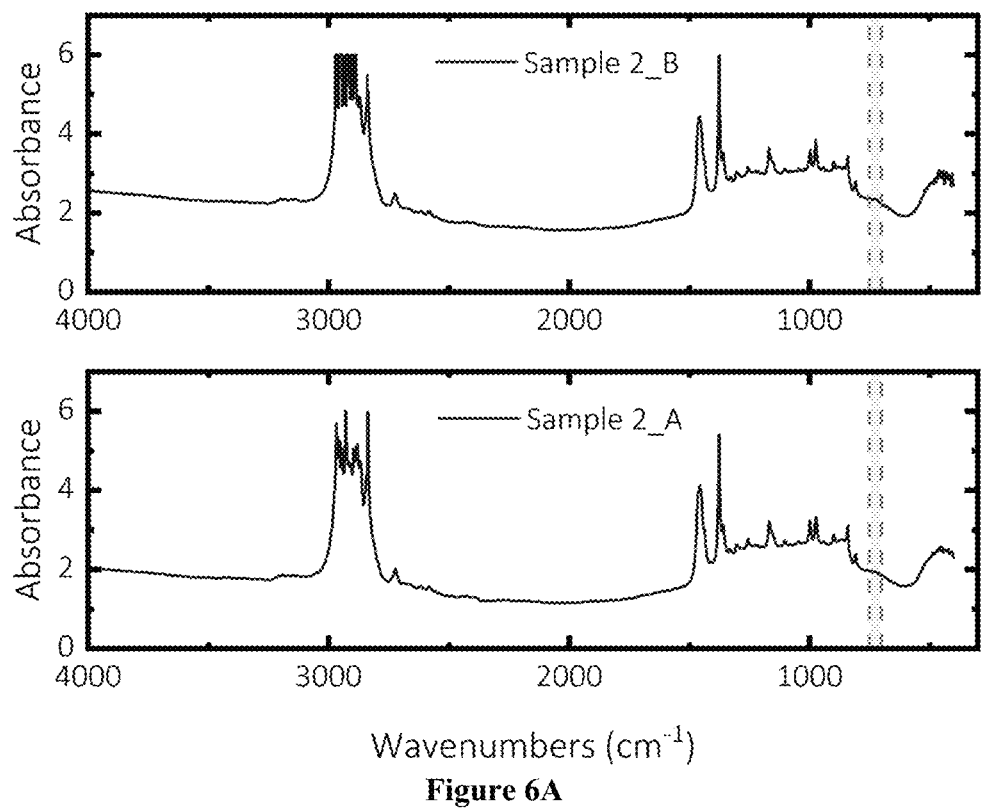
FIGS. 6A and 6B show the FTIR results for two comparative additive-manufacture feedstock, Sample 2 (FIG. 6A) and Sample 3 (FIG. 6B), described in Example 3. The shaded region in each graph shows the region from 700 to 750 $cm^{-1}$.
Figure 6B:
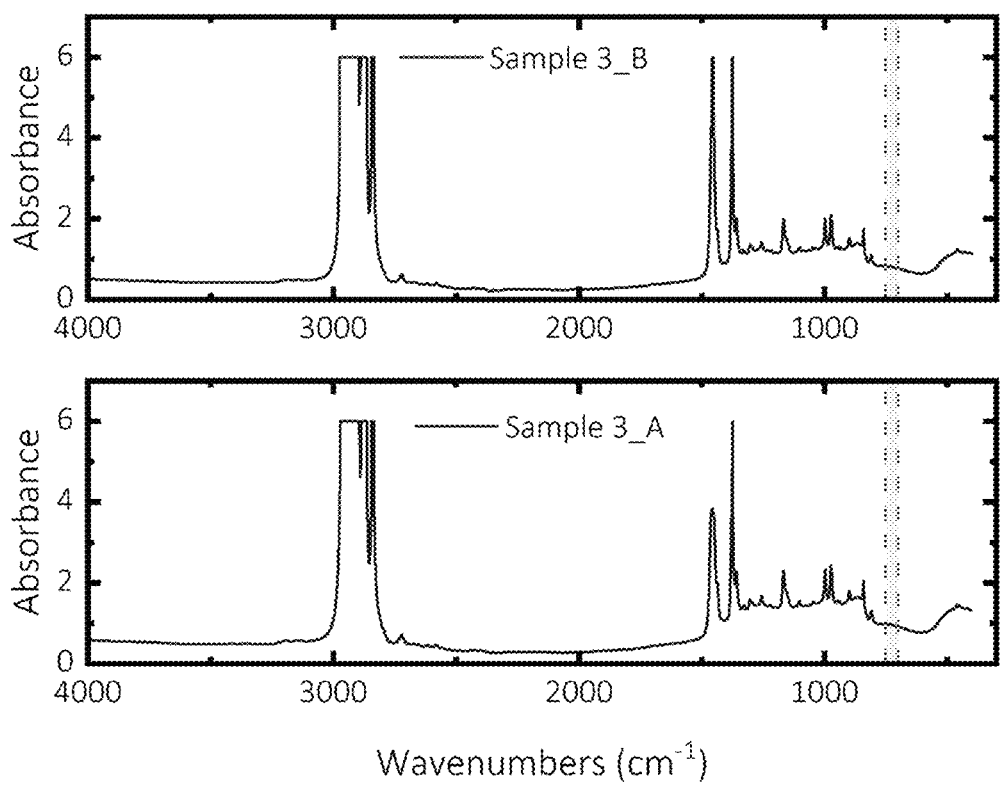

The base polypropylene matrix used in both comparative additive-manufacture feedstock, Sample 2 and Sample 3, were polypropylene homopolymers, not a heterophasic polypropylene copolymer containing a disperse phase. This is evident from the FTIR (Fourier-transform infrared spectroscopy) data from Samples 2 and 3, shown in FIGS. 6A and 6B. The peak positions and relative intensity of the peaks within the range of 700 to 750 $cm^{-1}$ would have revealed the presence of an ethylene-based disperse phase in a polypropylene polymer. As shown in the FTIR spectra for Sample 2 (FIG. 6A) and Sample 3 (FIG. 6B), there were no peaks present in the range of 700 to 750 cm$^{-1}$ for the FTIR of either sample, indicating that there was no ethylene content present in the feedstock material for Sample 2 and Sample 3. Therefore, it is reasonable to infer that both Sample 2 and Sample 3 use polypropylene homopolymer as the base matrix material to blend with the fibers.

The filaments from each of the inventive additive-manufacture feedstock (Sample 1) and the two comparative additive-manufacture feedstock (Sample 2 and Sample 3) were then loaded to a Fused Filament Fabrication based desktop 3D printer Ultimaker S5 (Ultimaker), and printed with the following printing parameters listed in Tables 1-2. Magigoo PP (Magigoo) was used as bed adhesion solution. Samples 1-3 were printed using the predefined slicing parameters listed in Table 1 to maintain consistency between various feedstock materials and were printed at the center of the printer bed. The variable slicing parameters listed in Table 2 were set to the optimal conditions for a given feedstock material.

TABLE 1

Predefined Slicing Parameters for printing Samples 1, 2, and 3.

| | |
|---|---|
| Nozzle diameter (mm) | 0.6 |
| Layer Height (mm) | 0.2 |
| Wall Count (#) | 3 |
| Top/Bottom Walls (#) | 0 |
| Infill Pattern | standard |
| Print Speed (mm/s) | 45 |
| Initial Print Speed (mm/s) | 20 |
| Slower Layers (#) | 2 |

TABLE 2

Variable Slicing Parameters for printing Samples 1, 2, and 3.

| | Sample 1 | Sample 2 | Sample 3 |
|---|---|---|---|
| Printing temperature (° C.) | 260 | 240 | 270 |
| Bed Temperature Initial (° C.) | 100 | 85 | 105 |
| Bed Temperature (° C.) | 85 | 80 | 65 |
| Cooling Speed (%) | 0 | 50 | 0 |

To evaluate the warpage resistance rating of each of the additive-manufacture feedstock in the form of a printed article, three 60 mm×60 mm×60 mm, open-ended boxes were printed for each of the additive-manufacture feedstock to be evaluated. For each printing, the print orientation is X-Y, and the thickness of each wall is 1 mm.

The warpage resistance rating for each additive-manufacture feedstock was determined according to the method described in Example 2.

For the inventive additive-manufacture feedstock (Sample 1), the warpage resistance parameters determined are listed in Table 3. The warpage resistance rating for Sample 1 was therefore determined to be $$\frac{0.24 + 0.26 + 0.24}{3} = 0.25.$$

TABLE 3

The warpage resistance parameters determined for Sample 1.

| Warpage Specimen 1 (WS$_1$) | | | | | |
|---|---|---|---|---|---|
| Y$_1$ | 59.56 | X$_1$ | 59.56 | Min Y | 59.31 |
| Y$_2$ | 59.31 | X$_2$ | 59.42 | Max X | 59.56 |
| Y$_3$ | 59.42 | X$_3$ | 59.44 | WS$_1$ | 0.25 |
| Y$_4$ | 59.44 | X$_4$ | 59.55 | | |
| Warpage Specimen 2 (WS$_2$) | | | | | |
| Y$_1$ | 59.56 | X$_1$ | 59.41 | Min Y | 59.31 |
| Y$_2$ | 59.31 | X$_2$ | 59.57 | Max X | 59.57 |
| Y$_3$ | 59.42 | X$_3$ | 59.5 | WS$_2$ | 0.26 |
| Y$_4$ | 59.44 | X$_4$ | 59.41 | | |
| Warpage Specimen 3 (WS$_3$) | | | | | |
| Y$_1$ | 59.56 | X$_1$ | 59.53 | Min Y | 59.31 |
| Y$_2$ | 59.31 | X$_2$ | 59.49 | Max X | 59.55 |
| Y$_3$ | 59.42 | X$_3$ | 59.42 | WS$_3$ | 0.24 |
| Y$_4$ | 59.44 | X$_4$ | 59.55 | | |

For comparative additive-manufacture feedstock, Sample 2, the warpage resistance parameters determined are listed in Table 4. The warpage resistance rating for Sample 2 was therefore determined to be $$\frac{1.28 + 1.21 + 1.33}{3} = 1.27.$$

TABLE 4

The warpage resistance parameters determined for Sample 2.

| Warpage Specimen 1 (WS$_1$) | | | | | |
|---|---|---|---|---|---|
| Y$_1$ | 59 | X$_1$ | 59.76 | Min Y | 58.56 |
| Y$_2$ | 58.92 | X$_2$ | 59.84 | Max X | 59.84 |
| Y$_3$ | 59.05 | X$_3$ | 59.79 | WS$_1$ | 1.28 |
| Y$_4$ | 58.56 | X$_4$ | 59.75 | | |
| Warpage Specimen 2 (WS$_2$) | | | | | |
| Y$_1$ | 58.61 | X$_1$ | 59.76 | Min Y | 58.61 |
| Y$_2$ | 58.73 | X$_2$ | 59.82 | Max X | 59.82 |
| Y$_3$ | 59.06 | X$_3$ | 59.8 | WS$_3$ | 1.21 |
| Y$_4$ | 58.7 | X$_4$ | 59.75 | | |
| Warpage Specimen 3 (WS$_3$) | | | | | |
| Y$_1$ | 58.61 | X$_1$ | 59.79 | Min Y | 58.46 |
| Y$_2$ | 58.46 | X$_2$ | 59.76 | Max X | 59.79 |
| Y$_3$ | 58.63 | X$_3$ | 59.7 | WS$_3$ | 1.33 |
| Y$_4$ | 58.93 | X$_4$ | 59.72 | | |

For comparative additive-manufacture feedstock, Sample 3, the warpage resistance parameters determined are listed in Table 5. The warpage resistance rating for Sample 2 was therefore determined to be $$\frac{1.37 + 1.26 + 1.44}{3} = 1.36.$$

TABLE 5

The warpage resistance parameters determined for Sample 3.

| Warpage Specimen 1 (WS$_1$) | | | | | |
|---|---|---|---|---|---|
| $Y_1$ | 59.16 | $X_1$ | 59.74 | Min Y | 58.38 |
| $Y_2$ | 58.38 | $X_2$ | 59.65 | Max X | 59.75 |
| $Y_3$ | 59.2 | $X_3$ | 59.75 | WS$_1$ | 1.37 |
| $Y_4$ | 58.85 | $X_4$ | 59.73 | | |
| Warpage Specimen 2 (WS$_2$) | | | | | |
| $Y_1$ | 58.8 | $X_1$ | 59.78 | Min Y | 58.53 |
| $Y_2$ | 58.53 | $X_2$ | 59.72 | Max X | 59.79 |
| $Y_3$ | 58.96 | $X_3$ | 59.65 | WS$_2$ | 1.26 |
| $Y_4$ | 58.84 | $X_4$ | 59.79 | | |
| Warpage Specimen 3 (WS$_3$) | | | | | |
| $Y_1$ | 58.3 | $X_1$ | 59.58 | Min Y | 58.3 |
| $Y_2$ | 58.6 | $X_2$ | 59.7 | Max X | 59.74 |
| $Y_3$ | 58.51 | $X_3$ | 59.74 | WS$_3$ | 1.44 |
| $Y_4$ | 58.35 | $X_4$ | 59.72 | | |

As shown above in Tables 4 and 5, the two comparative additive-manufacture feedstock (Sample 2 and Sample 3), using polypropylene homopolymers as the base matrix blended with glass fibers at 30% loading, when forming a printed article, both had a warpage resistance rating greater than 1 mm. Indeed, both had a similarly large warpage resistance rating of about 1.4. On the other hand, the inventive additive-manufacture feedstock (Sample 1), using a heterophasic polypropylene copolymer with an ethylene-based disperse phase as the base matrix blended with carbon fibers at 15% loading, when forming a printed article, had a warpage resistance rating of only 0.24 mm, indicating a minimized warpage. Therefore, the inventive additive-manufacture feedstock material had a significant improvement in resisting the thermodynamic warping during 3D printing.

Example 4—Additive-Manufacture Feedstock Having Heterophasic Polypropylene Copolymer Blended with Fibers The inventive additive-manufacture feedstock in this example contained various heterophasic polypropylene impact copolymers blended with carbon or glass fibers and were formed into printed articles. Comparative additive-manufacture feedstock contained various polypropylene homopolymers or random copolymers blended with carbon or glass fibers and were formed into printed articles. To illustrate the minimized warpage exhibited by the additive-manufacture feedstock, the warpage resistance ratings of the inventive and comparative feedstocks were determined, based on the method described in Examples 2 and 3, and compared against each other.

Heterophasic Polypropylene Copolymer Compositions

The inventive additive-manufacture feedstock was prepared according to Example 1. Various heterophasic polypropylene impact copolymers (ICP) were prepared, varying the disperse phase (estimated by the amorphous content measured by xylene soluble content on polypropylene, according to ASTM D5492-17) based on an ethylene-based elastomer, ethylene content, and melt flow rates. These heterophasic polypropylene impact copolymers in the form of pellets were used as the base matrix in the exemplary heterophasic polypropylene copolymer compositions (Samples I-IX). Two types of fibers were used: a carbon fiber, coated with maleic anhydride grafted polypropylene, was blended with some of the exemplary heterophasic polypropylene impact copolymers, with a loading of carbon fiber at 4-15 wt %; and a glass fiber, coated with a mixture of a silane-based sizing and maleic anhydride, was blended with some of the exemplary heterophasic polypropylene impact copolymers, with a loading of glass fiber at 30 wt %. The various properties of the exemplary heterophasic polypropylene copolymer compositions blended with fibers are listed in Table 6.

These fiber-blended heterophasic copolymers were extruded at 190° C. through a single screw extruder to form a filament having a constant diameter of 1.75 mm (±0.05) or 2.85 mm (±0.05). The filament obtained was wound on a spool that may be connected to the 3D printer.

Comparative Examples

Four commercially available additive-manufacture feedstock in a form of filament were obtained for comparison purposes. The comparative samples contained either polypropylene homopolymers (HPP) or polypropylene/ethylene random copolymers (RCP) as the base matrix. Comparative Sample I is a commercially available 3D printing filament from Owens Corning (Owens Corning XSTRAND GF30-PP) made of glass fiber-filled polypropylene homopolymer containing 30% glass fiber, having diameter of 2.85 mm (±0.05). Comparative Sample II is a commercially available 3D printing filament from BASF (BASF Innofil GF30) made of glass fiber-filled polypropylene homopolymer containing 29% glass fiber, having diameter of 2.85 mm (±0.05). Comparative Sample III is a commercially available 3D printing filament from 3DXTECH (3DXTECH CARBONX PP+CF) made of carbon fiber-filled polypropylene random copolymer containing 9% carbon fiber, having diameter of 2.85 mm (±0.05). Comparative Sample IV is a commercially available 3D printing filament from 3DXTECH (3DXTECH FIBREX PP+GF30 POLYPROPYLENE) made of glass fiber-filled polypropylene random copolymer containing 27% glass fiber, having diameter of 2.85 mm (±0.05).

Additive Printing

The filaments from each of the inventive additive-manufacture feedstocks (Samples I-IX) and the four comparative additive-manufacture feedstocks (Comparative Samples I-IV) were loaded onto a Fused Filament Fabrication based desktop 3D printer Ultimaker S5 (Ultimaker), and printed with the following printing parameters:

| | |
|---|---|
| Predefined Slicing Parameters | Nozzle diameter - 0.6 mm<br>Thickness of layer - 0.2 mm<br>Wall Count (#) - 3<br>Top/Bottom Walls (#) - 0<br>Slower Layers (#) - 2<br>Infill Pattern - standard<br>Print speed - 45 mm/s<br>Initial Print Speed - 20 mm/s |
| Variable Slicing Parameters | Printing temperature - 240-270° C.<br>Bed Temperature Initial - 85-105° C.<br>Bed temperature - 65-85° C. |

Magigoo PP (Magigoo) was used as a bed adhesion solution for all samples. All samples were printed using the predefined slicing parameters listed above to maintain consistency between various feedstock materials and were printed at the center of the printer bed. The variable slicing parameters listed above were set to the optimal conditions for a given feedstock material—the variable slicing parameters were the same for the inventive additive-manufacture feedstocks, and for the comparative additive-manufacture feedstocks, the variable slicing parameters for each sample were based on those recommended in the technical data sheet provided for a given feedstock material.

Measurement Methods

Melt flow rate (MFR). The melt flow rates of the polymer samples were measured at 230° C. with a 2.16 kg melt indexer weight in accordance with the ASTM D 1238 standard.

Xylene Solubles (XS). The xylene solubles percentages were measured using the conditions prescribed in ASTM D5492-17 using a flow injection polymer analysis unit.

Ethylene content (C2 wt %) by FTIR. FTIR spectra of the polymer samples were recorded on a Nicolet 6700 spectrophotometer from 4000 to 400 cm$^{-1}$. The ethylene content of the polymer samples was determined based on the FTIR measurements.

Ethylene content (C2 wt %) by NMR. $^{13}$C NMR of the polymer samples was recorded on a Bruker Avance III HD 500 MHz spectrometer with a 10 mm cryoprobe. The solvent was a mixture of 1,1,2,2-tetrachloroethylane-D2 and o-dichlorobenzene (1:4), with samples tested at 120° C. The ethylene content of the polymer samples was also determined using $^{13}$C NMR spectroscopy in accordance with the procedures described in Kakugo et al., *Macromolecules* 15, 1150-1152, 1982, which is incorporated herein by reference in its entirety.

Figure 7:
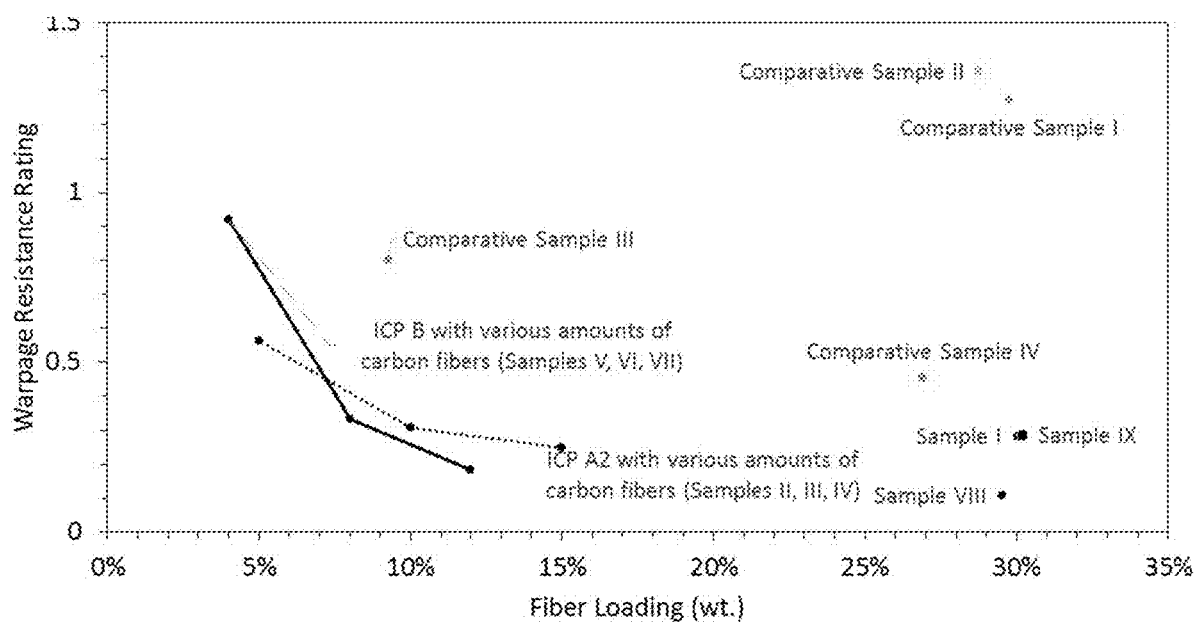
FIG. 7 shows the results of the warpage resistance ratings of various exemplary additive-manufacture feedstock samples (Samples I-IX, shown in Table 6, Example 4), compared to the comparative additive-manufacture feedstock samples (Comparative Samples I-IV, shown in Table 6, Example 4), when forming a printed article, in relation to the fiber loading amount.

To evaluate the warpage resistance rating of each of the additive-manufacture feedstocks in the form of a printed article, three 60 mm×60 mm×60 mm, open-ended boxes were printed for each of the additive-manufacture feedstocks. For each printing, the print orientation was X-Y, and the thickness of each wall was 1 mm. The warpage resistance rating for each additive-manufacture feedstock was determined according to the method described in Example 2. The results are listed in Table 6. The results of the warpage resistance ratings of various additive-manufacture feedstock samples in relation to the fiber loading amount are shown in FIG. 7.

rating, the lower the warpage, and the better performance of the additive-manufacture feedstock material.

As shown above in Table 6 as well as in FIG. 7, the comparative additive-manufacture feedstock using polypropylene homopolymers as the base matrix blended with glass fibers at 29-30% loading (Comparative Samples I and II), when forming a printed article, both had a warpage resistance rating greater than 1 mm (about 1.3-1.4). On the other hand, the inventive additive-manufacture feedstock using a heterophasic polypropylene impact copolymer with an ethylene-based disperse phase as the base matrix blended with glass fibers at 30% loading (Samples I, VIII, and IX), when forming a printed article, had a warpage resistance rating of less than 0.3 mm, indicating a significantly minimized warpage. This shows that, when blended with the same type of fiber material at a similar fiber loading, the inventive additive-manufacture feedstock material containing a heterophasic polypropylene impact copolymer (ICP) as the base matrix had a significant improvement in resisting the thermodynamic warping during 3D printing, as compared to the comparative additive-manufacture feedstock using polypropylene homopolymers (HPP) as the base matrix.

The comparative additive-manufacture feedstock using polypropylene/ethylene random copolymers (RCP) as the base matrix blended with glass fiber at 27% loading (Comparative Sample IV), when forming a printed article, had a warpage resistance rating of 0.45 mm. Whereas, the inventive additive-manufacture feedstock using a heterophasic polypropylene impact copolymer (ICP) with an ethylene-based disperse phase as the base matrix blended with glass fibers at 30% loading (Samples I, VIII, and IX), when forming a printed article, all had a warpage resistance rating of less than 0.3 mm, indicating a minimized warpage. Similarly, the comparative additive-manufacture feedstock using polypropylene/ethylene random copolymers (RCP) as the base matrix blended with carbon fiber at 9% loading (Comparative Sample III), when forming a printed article, had a warpage resistance rating of 0.80 mm. Whereas, the

TABLE 6

The warpage resistance ratings and various parameters determined for the inventive and comparative additive-manufacture feedstock samples

| Sample | | Polymer Type by NMR | MFR (g/10 min) | C2 % by FTIR | XS (%) | C2 % by NMR | Fiber Type | % Fiber Loading | Fiber Diameter (μm) SEM | Fiber Length (μm) Optical | Warpage Rating |
|---|---|---|---|---|---|---|---|---|---|---|---|
| ICP A1 blended with glass fiber | Sample I | ICP | 2.1 | 7.43 | 17.6 | 12.86 | Glass Fiber | 30% | 10 | 537.6 | 0.28 |
| ICP A2 blended with carbon fiber | Sample II | ICP | 5.4 | 11.90 | 24.8 | 13.72 | Carbon Fiber | 15% | 11.80 | 246.1 | 0.25 |
| | Sample III | ICP | 5.58 | 11.43 | 33.1 | 13.88 | Carbon Fiber | 10% | 11.80 | 255.7 | 0.31 |
| | Sample IV | ICP | 6.26 | 12.26 | 25.6 | 13.96 | Carbon Fiber | 5% | 11.80 | 274.8 | 0.56 |
| ICP B blended with carbon fiber | Sample V | ICP | 5.2 | 11.69 | 19.2 | 13.04 | Carbon Fiber | 12% | 11.80 | 304.2 | 0.18 |
| | Sample VI | ICP | 35.6 | 10.04 | 21.8 | — | Carbon Fiber | 8% | 11.80 | 359.9 | 0.33 |
| | Sample VII | ICP | 47.3 | 10.70 | 17.6 | — | Carbon Fiber | 4% | 11.80 | 150.2 | 0.92 |
| | Sample VIII | ICP | 6.3 | 10.66 | 17.4 | 11.16 | Glass Fiber | 30% | 10 | 387.2 | 0.11 |
| | Sample IX | ICP | 10.7 | 7.19 | 7.5 | 8.79 | Glass Fiber | 30% | 10 | 448.4 | 0.29 |
| Comparative Sample I | | HPP* | 8.5 | No peak | 6.6 | 0.4 | Glass Fiber | 30% | 10.12 | 90.0 | 1.27 |
| Comparative Sample II | | HPP* | 10.9 | No peak | 4.5 | 0.26 | Glass Fiber | 29% | 9.96 | 51.1 | 1.36 |
| Comparative Sample III | | RCP | 17.4 | — | 5.1 | 0.63 | Carbon Fiber | 9% | 8.28 | 93.8 | 0.80 |
| Comparative Sample IV | | RCP | 18.9 | — | 36.1 | 7.75 | Glass Fiber | 27% | — | 327.3 | 0.45 |

*The homopolymers contain negligible amounts of ethylene.

The values of the warpage resistance ratings, measured according to the equation described herein, indicates the amount of warpage. The lower the warpage resistance inventive additive-manufacture feedstock using a heterophasic polypropylene impact copolymer (ICP) with an ethylene-based disperse phase as the base matrix blended with carbon fibers at 8-10% loading (Samples III and VI), when forming a printed article, both had a warpage resistance rating of less than 0.35 mm, indicating a significantly minimized warpage. These results show that, when blended with the same type of fiber material at a similar fiber loading, the inventive additive-manufacture feedstock material containing a heterophasic polypropylene impact copolymer (ICP) as the base matrix had a significant improvement in resisting the thermodynamic warping during 3D printing, as compared to the comparative additive-manufacture feedstock using polypropylene random copolymers (RCP) as the base matrix.

The results also show that, for the heterophasic polypropylene impact copolymer in the additive-manufacture feedstock, increasing the amount of disperse phase and/or ethylene content could result in an minimized warpage. For instance, for the additive-manufacture feedstock Samples VIII and IX using a heterophasic polypropylene ICP blended with the same glass fibers at the same 30% loading, Sample VIII, having a higher XS % and C2%, had a better warpage resistance rating (0.11) than Sample IX (0.29) having a lower XS % and C2%.

In general, the results show that increasing the amount of fiber loading can minimize the warpage, whereas decreasing the amount of fiber loading can result in an increase in warpage. This can be seen by comparing the warpages of Samples II, III, and IV with decreasing carbon fiber loading from 15% to 5%; and by comparing the warpages of Samples V, VI, and VII with decreasing carbon fiber loading from 12% to 4%. When using the heterophasic polypropylene impact copolymer (ICP) with an ethylene-based disperse phase as the base matrix in the inventive additive-manufacture feedstock, the resulting warpage resistance rating was shown to still be below 1 mm (Sample VII, 0.92; Sample IV, 0.56), even when the fiber loading is decreased to 4-5%.

In sum, the results above illustrate that the inventive additive-manufacture feedstock material had a significant improvement in resisting the thermodynamic warping during 3D printing.

What is claimed is:

1. An additive-manufacture feedstock, comprising:
a heterophasic copolymer having a melt flow rate of from 0.1 to 150 g/10 min (230° C./2.16 kg), measured according to ASTM D 1238, and
a first-fiber blended in the heterophasic copolymer,
wherein:
the first-fiber is present in the additive-manufacture feedstock in an amount of from 1.0 to 40 wt %, relative to 100 wt % of the additive-manufacture feedstock, and
the first-fiber-blended heterophasic copolymer, when in the form of a printed article, exhibits a warpage resistance rating of at most 1 mm, measured according to the following equation and 48 hours after printing the printed article:

$$\text{warpage resistance rating} = \frac{\sum_{i=1}^{N} WS_i}{N}$$

wherein:
$\sum_{i=1}^{N} WS_i$ sums the values of WSi, starting at $WS_1$ and ending with $WS_N$,
N is the total number of printed articles measured for warpage resistance rating evaluation,
i is a $i^{th}$ printed article measured,
$WSi = \text{Max}(X_1,X_2,X_3,X_4)_i - \text{Min}(Y_1,Y_2,Y_3,Y_4)_i$ for a $i^{th}$ printed article measured, $X_1$, $X_2$, $X_3$, and $X_4$, respectively, represent a height of a first central edge, a height of a second central edge, a height of a third central edge, and a height of a fourth central edge, of the $i^{th}$ printed article measured, $Y_1$, $Y_2$, $Y_3$, and $Y_4$, respectively, represent a height of a first corner edge, a height of a second corner edge, a height of a third corner edge, and a height of a fourth corner edge, of the $i^{th}$ printed article measured, Max $(X_1,X_2,X_3,X_4)_i$ represents the maximum value of $X_1$, $X_2$, $X_3$, and $X_4$, for the $i^{th}$ printed article measured, and Min $(Y_1,Y_2,Y_3,Y_4)_i$ represents the minimum value of $Y_1$, $Y_2$, $Y_3$, and $Y_4$, for the $i^{th}$ printed article measured, wherein each printed article measured for warpage resistance rating evaluation is a 60 mm×60 mm×60 mm cubic box, each side of the cubic box having a thickness of 1 mm.

2. The additive-manufacture feedstock according to claim 1, wherein the first-fiber is present in the additive-manufacture feedstock in an amount of from 4.0 to 30 wt %, relative to 100 wt % of the additive-manufacture feedstock.

3. The additive-manufacture feedstock according to claim 1, further comprising a sizing compatible with the first-fiber-blended heterophasic copolymer.

4. The additive-manufacture feedstock according to claim 1, wherein the first-fiber, in the additive-manufacture feedstock, has a length of 10 to 10,000 µm.

5. The additive-manufacture feedstock according to claim 4, wherein the first-fiber, in the additive-manufacture feedstock, has a length of from 100 to 600 µm.

6. The additive-manufacture feedstock according to claim 1, wherein the first-fiber, in the additive-manufacture feedstock, has an aspect ratio of at least 10.

7. The additive-manufacture feedstock according to claim 1, wherein the heterophasic copolymer, having the first-fiber present therein, has a melt flow rate of from 0.1 to 50 g/10 min (230° C./2.16 kg), measured according to ASTM D 1238.

8. The additive-manufacture feedstock according to claim 1, wherein the heterophasic copolymer has a melt flow rate of from 0.5 to 40 g/10 min (230° C./2.16 kg), measured according to ASTM D 1238.

9. The additive-manufacture feedstock according to claim 1, wherein the heterophasic copolymer has a melt flow rate of from 3 to 10 g/10 min (230° C./2.16 kg), measured according to ASTM D 1238.

10. The additive-manufacture feedstock according to claim 1, wherein the heterophasic copolymer comprises a matrix phase and a disperse phase, the disperse phase being present in an amount of from 5 wt % to 50 wt %.

11. The additive manufacture feedstock according to claim 1, wherein the matrix phase comprises a polypropylene homopolymer, a polypropylene random copolymer, a polypropylene block copolymer, or a combination thereof.

12. The additive-manufacture feedstock according to claim 1, wherein the heterophasic copolymer is present in the additive-manufacture feedstock in an amount of from 40 to 99 wt %, relative to 100 wt % of the additive-manufacture feedstock.

13. The additive-manufacture feedstock according to claim 1, further comprising an additive, other than the first-fiber, selected from the group consisting of a sliding agent, an antioxidant, a pigment, an inorganic filler, a reinforcement, an adhesion-promoting agent, a biocide, a whitening agent, a nucleating agent, an anti-static agent, an anti-blocking agent, a processing aid, a flame-retardant, a plasticizer, a heat stabilizer, a light stabilizer, a polyethylene, a polypropylene, an elastomer, a thermoplastic polyurethane, and any combination thereof.

14. The additive-manufacture feedstock according to claim 11, further comprising the sliding agent, present in the amount of from 0.05 wt % to 3 wt %, relative to 100 wt % of the additive-manufacture feedstock.

15. The additive-manufacture feedstock according to claim 11, further comprising an inorganic filler, wherein the inorganic filler comprises at least one member selected from the group consisting of talc, marble dust, cement dust, clay, carbon black, feldspar, silica, glass, fumed silica, silicate, calcium silicate, silicic acid powder, glass microspheres, mica, metal oxide particles and nanoparticles such as magnesium oxide, antimony oxide, zinc oxide, barium sulfate, wollastonite, alumina, aluminum silicate, a titanium oxide, calcium carbonate, and a polyhedral oligomeric silsesquioxane.

16. The additive-manufacture feedstock according to claim 1, wherein the first-fiber is a natural fiber, carbon fiber, glass fiber, or a combination thereof.

17. A filament, comprising the additive-manufacture feedstock according to claim 1.

18. The filament according to claim 17, having a length of 0.1 to 50000 meters.

19. The filament according to claim 18, having a diameter of from 1 to 5 mm, ±0.05 mm.

20. The filament according to claim 17, having a diameter of 1.75 mm or 2.85 mm, ±0.05 mm.

21. A distribution of pellets, each pellet comprising additive-manufacture feedstock according to claim 1.

22. The distribution of pellets according to claim 21, having a count of 5 to 60 pellets per gram of the distribution.

23. The distribution of pellets according to claim 21, having a count of 5 to 20 pellets per gram of the distribution.

24. The distribution of pellets according to claim 21, having a count of 30 to 60 pellets per gram of the distribution.

25. A method of three-dimensional printing, the method comprising:
   (1) supplying the additive-manufacture feedstock according to claim 1 to a printing apparatus and forming a hot-melt of the additive-manufacture feedstock;
   (2) depositing the hot-melt of the additive-manufacture feedstock from the printing apparatus on a substrate to form a first deposited printing layer;
   (3) repeating (1) and (2) to deposit a second printing layer on the first printing layer; and
   (4) optionally depositing at least one further printing layer on said second printing layer.

26. The method of three-dimensional printing, according to claim 25, wherein the printing apparatus employs a fused filament fabrication method.

27. A method of making an additive-manufacture feedstock according to claim 1, comprising: blending the heterophasic copolymer having a melt flow rate of from 0.1 to 150 g/10 min (230° C./2.16 kg), measured according to ASTM D 1238, and the first-fiber to form the additive-manufacture feedstock.

* * * * *